United States Patent
Rune et al.

(10) Patent No.: US 12,336,007 B2
(45) Date of Patent: Jun. 17, 2025

(54) HANDLING MULTIPLE TRANSMISSION OPPORTUNITIES IN A PAGING OCCASION

(71) Applicant: TELEFONAKTIEBOLAGET LM ERICSSON (PUBL), Stockholm (SE)

(72) Inventors: Johan Rune, Lidingö (SE); Peter Alriksson, Hörby (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 646 days.

(21) Appl. No.: 17/289,094

(22) PCT Filed: Nov. 1, 2019

(86) PCT No.: PCT/IB2019/059401
§ 371 (c)(1),
(2) Date: Apr. 27, 2021

(87) PCT Pub. No.: WO2020/089854
PCT Pub. Date: May 7, 2020

(65) Prior Publication Data
US 2022/0015146 A1    Jan. 13, 2022

Related U.S. Application Data

(60) Provisional application No. 62/754,346, filed on Nov. 1, 2018.

(51) Int. Cl.
*H04W 74/0816* (2024.01)
*H04B 7/06* (2006.01)
*H04W 68/02* (2009.01)

(52) U.S. Cl.
CPC ...... *H04W 74/0816* (2013.01); *H04B 7/0695* (2013.01); *H04W 68/02* (2013.01)

(58) Field of Classification Search
None
See application file for complete search history.

(56) References Cited

U.S. PATENT DOCUMENTS

| 11,166,257 B2 * | 11/2021 | Rune ................. H04W 72/23 |
| 2017/0367069 A1 * | 12/2017 | Agiwal ............ H04W 68/025 |

(Continued)

FOREIGN PATENT DOCUMENTS

| CN | 108370556 A | 8/2018 |
| CN | 108702707 A | 10/2018 |

(Continued)

OTHER PUBLICATIONS

U.S. Appl. No. 62/587,255, filed Nov. 16, 2017, Park et al., "Beam Paging Assistance Information of Base Station", p. 1-48 and Fig. 1-18.*

(Continued)

*Primary Examiner* — Gregory B Sefcheck
(74) *Attorney, Agent, or Firm* — Frost Brown Todd LLP

(57) ABSTRACT

A method is provided for use in a network node in wireless communications network. The method includes determining, a plurality of transmission opportunities, TXOPs, in which to attempt to transmit a paging signal in a plurality of beams. The plurality of beams have a beam order. The method further includes assigning a predetermined number of the plurality of TXOPs to each beam of the plurality of beams, wherein none of the TXOPs is assigned to more than one beam. The method further includes performing at least one clear channel assessment, CCA, before transmitting the paging signal in one of the TXOPs. The method further includes transmitting the paging signal in a first beam of the plurality of beams using one of the plurality of TXOPs assigned to the first beam based on a first successful CCA covering the used TXOP.

30 Claims, 17 Drawing Sheets

(56) References Cited

U.S. PATENT DOCUMENTS

| | | | |
|---|---|---|---|
| 2018/0220288 A1* | 8/2018 | Agiwal | H04W 4/30 |
| 2018/0242277 A1 | 8/2018 | Liu | |
| 2019/0045481 A1* | 2/2019 | Sang | H04W 76/14 |
| 2019/0182800 A1* | 6/2019 | Park | H04L 5/0048 |
| 2019/0208501 A1* | 7/2019 | Xi | H04W 68/02 |
| 2019/0254110 A1* | 8/2019 | He | H04L 5/0048 |
| 2019/0327709 A1* | 10/2019 | Li | H04W 72/046 |
| 2019/0380099 A1* | 12/2019 | Hakola | H04B 7/0695 |
| 2020/0022106 A1* | 1/2020 | Kim | H04L 1/1812 |
| 2020/0037274 A1* | 1/2020 | Pan | H04W 72/046 |
| 2020/0053571 A1* | 2/2020 | Tsai | H04L 5/0092 |
| 2020/0053670 A1* | 2/2020 | Jung | H04W 56/00 |
| 2020/0053781 A1* | 2/2020 | Pan | H04W 72/30 |
| 2020/0092846 A1* | 3/2020 | Deng | H04W 68/025 |
| 2020/0120634 A1* | 4/2020 | Lee | H04W 68/02 |
| 2020/0367198 A1* | 11/2020 | Tang | H04W 72/046 |
| 2020/0374960 A1* | 11/2020 | Deenoo | H04B 7/0695 |
| 2020/0404617 A1* | 12/2020 | Murray | H04W 68/02 |
| 2020/0404620 A1* | 12/2020 | Sang | H04W 68/06 |
| 2021/0127354 A1* | 4/2021 | Rune | H04W 24/08 |
| 2021/0136726 A1* | 5/2021 | Niu | H04W 48/08 |
| 2021/0185652 A1* | 6/2021 | Rune | H04L 5/0053 |
| 2021/0204244 A1* | 7/2021 | Rune | G01L 9/0054 |
| 2021/0314910 A1* | 10/2021 | Rune | H04L 27/2607 |
| 2021/0385785 A1* | 12/2021 | Lee | H04W 72/23 |
| 2022/0039061 A1* | 2/2022 | Murray | H04W 56/001 |
| 2024/0251383 A1* | 7/2024 | Murray | H04W 72/23 |

FOREIGN PATENT DOCUMENTS

| | | |
|---|---|---|
| JP | 2019517755 A | 6/2019 |
| WO | 2017026188 A1 | 2/2017 |
| WO | 2017211682 A1 | 12/2017 |
| WO | 2018025946 A1 | 2/2018 |
| WO | 2018128884 A1 | 7/2018 |
| WO | 2018156280 A1 | 8/2018 |
| WO | 2020030675 A1 | 2/2020 |

OTHER PUBLICATIONS

U.S. Appl. No. 62/587,265, filed Nov. 16, 2017, Park et al., "Paging Message with Beam Information", p. 1-48 and Fig. 1-18.*
U.S. Appl. No. 62/753,840 dated Oct. 31, 2018, Lee et al., "Paging Enhancement for NR Unlicensed", p. 1-61.*
Intel Corporation: "Paging enhancement for NR-U". 3GPP TSG-RAN WG2 103bis. R2-1814060. Chengdu, China. Oct. 8-12, 2018.
Qualcomm Incorporated, Initial access and mobility procedures for NR unlicensed, R1-1811253, 3GPP TSG RAN WG1 Meeting #94bis, Chengdu, China, Oct. 8-12, 2018.
LG Electronics Inc., Paging enhancements in NR Unlicensed band, R2-1816446, 3GPP TSG-RAN WG2#104, Spokane, USA, Nov. 12-16, 2018.
Charter Communications, Feature lead summary #1 of initial access and mobility, R1-1811885, 3GPP TSG RAN WG1 Meeting RAN1#94BIS, Chengdu, P.R. China, Oct. 8-12, 2018.
Huawei, et al.: "Discussion on paging and SI for NR-U". 3GPP TSG-RAN WG2 Meeting #103. R2-1812660. Gothenburg, Sweden, Aug. 20-24, 2018.

* cited by examiner

```
-- ASN1START
-- TAG-SEARCHSPACE-START

SearchSpace ::=        SEQUENCE {
    searchSpaceId          SearchSpaceId,
    controlResourceSetId   ControlResourceSetId  OPTIONAL, -- Cond SetupOnly
    monitoringSlotPeriodicityAndOffset  CHOICE {
        sl1          NULL,
        sl2          INTEGER (0..1),
        sl4          INTEGER (0..3),
        sl5          INTEGER (0..4),
        sl8          INTEGER (0..7),
        sl10         INTEGER (0..9),
        sl16         INTEGER (0..15),
        sl20         INTEGER (0..19),
        sl40         INTEGER (0..39),
        sl80         INTEGER (0..79),
        sl160        INTEGER (0..159),
        sl320        INTEGER (0..319),
        sl640        INTEGER (0..639),
        sl1280       INTEGER (0..1279),
        sl2560       INTEGER (0..2559)
    }                                                        OPTIONAL, -- Cond Setup
    duration     INTEGER (2..2559)                           OPTIONAL, -- Need R
    monitoringSymbolsWithinSlot  BIT STRING (SIZE (14))      OPTIONAL, -- Cond Setup
    ...
}

-- TAG-SEARCHSPACE-STOP
-- ASN1STOP
```

FIGURE 1B

```
firstPDCCH-MonitoringOccasionOfPO CHOICE {
    sCS15KHZoneT                              SEQUENCE (SIZE (1..4)) OF INTEGER (0..139),
    sCS30KHZoneT-SCS15KHZhalfT                SEQUENCE (SIZE (1..4)) OF INTEGER (0..279),
    sCS60KHZoneT-SCS30KHZhalfT-SCS15KHZquarterT SEQUENCE (SIZE (1..4)) OF INTEGER (0..559),
    sCS120KHZoneT-SCS60KHZhalfT-SCS30KHZquarterT-SCS15KHZoneEighthT SEQUENCE (SIZE (1..4)) OF INTEGER (0..1119),
    sCS120KHZhalfT-SCS60KHZquarterT-SCS30KHZoneEighthT-SCS15KHZoneSixteenthT SEQUENCE (SIZE (1..4)) OF INTEGER (0..2239),
    sCS120KHZquarterT-SCS60KHZoneEighthT-SCS30KHZoneSixteenthT SEQUENCE (SIZE (1..4)) OF INTEGER (0..4479),
    sCS120KHZoneEighthT-SCS60KHZoneSixteenthT SEQUENCE (SIZE (1..4)) OF INTEGER (0..8959),
    sCS120KHZoneSixteenthT                    SEQUENCE (SIZE (1..4)) OF INTEGER (0..17919)
} OPTIONAL,    -- Need R
```

FIGURE 1C

HANDLING MULTIPLE TRANSMISSION OPPORTUNITIES IN A PAGING OCCASION

This application is a 371 of International Application No. PCT/IB2019/059401, filed Nov. 1, 2019, which claims the benefit of U.S. Application No. 62/754,346, filed Nov. 1, 2018, the disclosures of which are fully incorporated herein by reference.

TECHNICAL FIELD

Certain embodiments of the present disclosure relate, in general, to wireless communications and, more particularly, to paging in wireless networks.

BACKGROUND

Overview of 5G/New Radio (NR)

An important property of the coming 5G system (e.g., NR) is the usage of high carrier frequencies, e.g. in the range 24.25-52.6 GHz. For such high frequency spectrum, the atmospheric, penetration and diffraction attenuation properties can be much worse than for lower frequency spectrum. In addition, the receiver antenna aperture, as a metric describing the effective receiver antenna area that collects the electromagnetic energy from an incoming electromagnetic wave, is inversely proportional to the frequency, i.e., the link budget would be worse for the same link distance even in a free space scenario, if omnidirectional receive and transmit antennas are used. This motivates the usage of beamforming to compensate for the loss of link budget in high frequency spectrum. This is particularly important when communicating with user equipments (UEs) with poor receivers, e.g. low cost/low complexity UEs. Other means for improving the link budget include repetition of the transmissions (e.g. to allow wide beam or omnidirectional transmission) or use of Single Frequency Network transmission from multiple transmission reception points (TRPs) in the same or different cells.

Due to the above described properties, in the high frequency bands, many downlink signals, such as synchronization signals, system information, and paging, which need to cover a certain area (e.g., not just targeting a single UE with known location/direction), e.g. a cell, are expected to be transmitted using beam sweeping, i.e., transmitting the signal in one beam at a time, sequentially changing the direction and coverage area of the beam until the entire intended coverage area, e.g. the cell, has been covered by the transmission. Also in lower carrier frequencies, e.g., ranging from below 3 GHz to 6 GHz, beamforming is envisioned to be used in NR to improve coverage, albeit with fewer beams to cover a cell area.

The signals and channels in NR which correspond to the Primary Synchronization Signal (PSS), the Secondary Synchronization Signal (SSS), Cell-Specific Reference Signal (CRS) and Physical Broadcast Channel (PBCH) (which carries the Master Information Block (MIB) and layer 1 generated bits) in LTE, i.e., PSS, SSS, DMRS for PBCH and PBCH (sometimes referred to as NR-PSS, NR-SSS, DMRS for NR-PBCH and NR-PBCH in NR) are put together in an entity/structure denoted SS Block (SSB) or, with other terminology, SS/PBCH block (the term SS Block is typically used in the RAN2 3GPP working groups while the RAN1 working group usually uses the term SS/PBCH block). Hence, SS Block, SSB and SS/PBCH block may be used interchangeably (although SSB is really an abbreviation of SS Block). The combination of the PSS+SSS enables a UE to synchronize with the cell and also carries information from which the Physical Cell Identity (PCI) can be derived. The PBCH part (including a Demodulation Reference Signal (DMRS)) of the SSB carries a part of the system information denoted MIB (Master Information Block) or NR-MIB, 8 layer-one generated bits and the SSB index within the SS Burst Set. In high frequencies, SS Blocks will be transmitted periodically using beam sweeping. Multiple such beamformed SS Block transmissions are grouped into an SS Burst Set which constitutes a full beam sweep of SS Block transmissions. When many beams are used, longer gaps, e.g. 2 or 4 slots (where each slot contains 14 Orthogonal Frequency Division Multiplexing (OFDM) symbols) are be inserted into the beam sweep. This effectively creates groups of SS Block transmissions within the SS Burst Set, which, using an obsolete term, could be referred to as SS Bursts.

In NR, the system information (SI) is divided into the two main parts "Minimum SI" (MSI) and "Other SI" (OSI). The MSI is always periodically broadcast, whereas the OSI may be periodically broadcast or may be available on-demand (and different parts of the OSI may be treated differently). The MSI consists of the MIB and System Information Block type 1 (SIB1), where SIB1 is also referred to as Remaining Minimum System Information (RMSI) (the term SIB1 is typically used by RAN2 while RAN1 usually uses the term RMSI). SIB1/RMSI is periodically broadcast using a Physical Downlink Control/Shared Channel (PDCCH/PDSCH)-like channel structure, i.e. with a scheduling allocation transmitted on the PDCCH (or NR-PDCCH), allocating transmission resources on the PDSCH (or NR-PDSCH), where the actual RMSI is transmitted. The MIB contains information that allows a UE to find and decode RMSI/SIB1. More specifically, configuration parameters for the PDCCH utilized for the RMSI/SIB1 is provided in the MIB (when an associated RMSI/SIB1 exists). A further 3GPP agreement for release 15 concerning RMSI transmission is that the RMSI/SIB1 transmissions should be spatially Quasi Co-Located (QCL) with the SS Block transmissions. A consequence of the QCL property is that the PSS/SSS transmission can be relied on for accurate synchronization and beam selection to be used when receiving the PDCCH/PDSCH carrying the RMSI/SIB1. The same QCL assumption is valid for paging.

As in LTE, paging and OSI in NR are transmitted using the PDCCH+PDSCH principle with PDSCH DL scheduling allocation on the PDCCH and Paging message or SI message on the PDSCH. An exception to this is that paging information may optionally be conveyed in the paging DCI on the PDCCH (referred to as "Short Message"), thus skipping the Paging message on the PDSCH. For release 15, this has been agreed to be used when paging is used for notification of Earthquake and Tsunami Warning System (ETWS), Commercial Mobile Alert System (CMAS) or System Information (SI) update. For future releases, it is possible that other paging cases may utilize this PDCCH only transmission mechanism. The configuration information for the PDCCH used for paging and the PDCCH used for OSI transmission is included in the RMSI/SIB1. For both paging and OSI, the same CORESET (i.e., the control resource set for Type0-PDCCH common search space) may be used as for RMSI/SIB1 if the UE is not provided by dedicated higher layer signaling with a control resource set for Type0A-PDCCH common search space (for OSI) or for Type2-PDCCH common search space (for paging).

In the RMSI/SIB1 for a Primary Cell or in dedicated signaling for other serving cells (as specified in 3GPP TS 38.331 version 15.1.0), the search space (i.e., the time windows and time repetition pattern of PDCCH monitoring occasions as well as the associated CORESET) for paging is indicated in the pagingSearchSpace parameter (more details about this parameter are found further below) while the OSI search space is indicated in the searchSpaceOtherSysteminformation parameter. If the configuration information for the PDCCH for paging is not available in the RMSI/SIB1 or dedicate signaling (i.e. if the pagingSearchSpace parameter is not present in the RMSI/SIB1 or not signaled via dedicated signaling) or the pagingSearchSpace is set to 0 (i.e. searchSpaceId zero), then the monitoring windows/monitoring occasions for the PDCCH (i.e. essentially the search space) are the same as those configured for RMSI/SIB1.

Note: The pagingSearchSpace parameter contains a SearchSpaceId, which points out a set of parameters which constitute a PDCCH search space configuration. This complexity is henceforth overlooked herein and the term pagingSearchSpace is henceforth used to refer to the set of parameters that configure the PDCCH search space for paging.

It is also relevant to describe a difference in the time domain structure of L1 of the radio interface between LTE and NR. While LTE always has the same structure, NR may have different structures, because it includes different so-called numerologies (which essentially can be translated to different subcarrier spacings (SCSs) and consequent differences in the time domain, e.g. the length of an OFDM symbol). In LTE, the L1 radio interface time domain structure consists of symbols, subframes and radio frames, where a 1 ms subframe consists of 14 symbols (12 if extended cyclic prefix is used) and 10 subframes form a 10 ms radio frame. In NR, the concepts of subframes and radio frames are reused in the sense that they represent the same time periods, i.e. 1 ms and 10 ms respectively, but their internal structures vary depending on the numerology. For this reason, the additional term "slot" is introduced in NR, which is a time domain structure that always contains 14 symbols (for normal cyclic prefix), irrespective of the symbol length. Note that the choice of the term "slot" to refer to a set of 14 OFDM symbols in NR is somewhat unfortunate, since the term "slot" also exists in LTE, although in LTE it refers to half a subframe, i.e. 0.5 ms containing 7 OFDM symbols (or 6 OFDM symbols in when extended cyclic prefix is used). Hence, the number of slots and symbols comprised in a subframe and a radio frame vary with the numerology, but the number of symbols in a slot remains consistent. The numerologies and parameters are chosen such that a subframe always contains an integer number of slots (i.e. no partial slots). More details about the physical layer structure follow below.

Similar to LTE, NR uses OFDM (Orthogonal Frequency Division Multiplexing) in the downlink (e.g., from a network node, gNB, eNB, or base station, to a user equipment or UE). The basic NR physical resource over an antenna port can thus be seen as a time-frequency grid as illustrated in FIG. 1A, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times 2^{\alpha})$ kHz where $\alpha \in (0, 1, 2, 3, 4)$. $\Delta f=15$ kHz is the basic (or reference) subcarrier spacing that is also used in LTE.

In the time domain, downlink and uplink transmissions in NR will be organized into equally-sized subframes of 1 ms each similar to LTE. A subframe is further divided into multiple slots of equal duration. The slot length for subcarrier spacing $\Delta f=(15\times 2^{\alpha})$ kHz is $\frac{1}{2}^{\alpha}$ ms. There is only one slot per subframe at $\Delta f=15$ kHz and a slot consists of 14 OFDM symbols.

Downlink transmissions are dynamically scheduled, i.e., in each slot the gNB transmits downlink control information (DCI) about which UE data is to be transmitted to and which resource blocks in the current downlink slot the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A UE first detects and decodes PDCCH and if a PDCCH is decoded successfully, it then decodes the corresponding PDSCH based on the decoded control information in the PDCCH.

In addition to PDCCH and PDSCH, there are also other channels and reference signals transmitted in the downlink.

Uplink data transmissions, carried on Physical Uplink Shared Channel (PUSCH), are also dynamically scheduled by the gNB by transmitting a DCI. In case of TDD operation, the DCI (which is transmitted in the DL region) always indicates a scheduling offset so that the PUSCH is transmitted in a slot in the UL region.

Paging in NR

Paging is an essential function in a mobile telecommunications system. It is used to let the network contact a UE while in a RRC_IDLE or RRC_INACTIVE (see further below) state (where RRC stands for Radio Resource Control), primarily in order to transmit downlink data to the UE, once the UE has responded to the page. Paging can also be used to inform UEs of updates of the system information in a cell. It can also be used for informing UEs of an ongoing public warning such as ETWS or CMAS.

In LTE, a UE in RRC_IDLE state camps on a cell and while camping monitors the paging channel associated with that cell. The UE is configured to monitor repeatedly occurring paging occasions and may reside in a Discontinuous Reception (DRX) sleep mode in between the paging occasions. When the UE is paged at such a paging occasion, the paging is indicated on the PDCCH in the form of a DL scheduling allocation addressed to the Paging Radio Network Temporary Identifier (P-RNTI) (which may be shared by all UEs). This DL scheduling allocation indicates the DL transmission resources on the PDSCH, where the actual Paging message is transmitted. A UE in RRC_IDLE state, which receives a DL scheduling allocation addressed to the P-RNTI at one of the UE's paging occasions, receives and reads the Paging message from the allocated DL transmission resources to find out whether the Paging message is intended for the UE. The UE(s) that is(are) subject to the paging is(are) indicated in the Paging message through one or more UE paging identifiers (S-TMSI or IMSI), wherein each UE paging identifier is included in a paging record. Up to 16 UEs may be addressed, i.e., there may be up to 16 paging records in one Paging message.

Most of these paging principles and mechanisms are reused in NR. However, in NR a new state is introduced, tentatively denoted RRC_INACTIVE state, for which paging is also relevant. The purpose of introducing the RRC_INACTIVE state in addition to the RRC_IDLE state is to introduce a low-energy state with reduced signaling overhead over the radio and network interfaces and improved UE access latency as well as UE energy consumption when the UE moves from an energy saving state to a state designed for transmission and reception of user data (i.e. RRC_CONNECTED state). In this state, the core network still regards the UE as connected and thus the RAN-CN connection is kept active, while the RRC connection between the gNB and the UE is released. The UE's RAN context is maintained in the anchor gNB and the RAN-CN connection is maintained between the anchor gNB and the core network. In order to reduce radio interface signaling at connection establishment, the context information is kept active in the UE and in the anchor gNB which enables the UE to resume the RRC connection when it is paged from the RAN or has UL data or signaling to send. In this state, the UE can move around in a RAN Notification Area (RNA) without informing the network of its whereabouts, but as soon as it leaves its configured RNA, it informs the network. In NR, paging can thus be used for a UE in either RRC_IDLE state or RRC_INACTIVE state. In RRC_IDLE state, the paging is initiated by the CN, while paging of a UE in RRC_INACTIVE state is initiated by the RAN (the anchor gNB). In certain cases, a UE in RRC_INACTIVE state must be prepared to receive paging initiated by either the RAN or the CN. Normally, paging of a UE in RRC_INACTIVE state is initiated by the RAN, but in cases of state mismatch between the UE and the CN, the CN may initiate paging of a UE that considers itself to be in RRC_INACTIVE state.

For CN-initiated paging, the UE ID used in the Paging message is the 5G-S-TMSI in NR (replacing the S-TMSI that is used in LTE. For RAN initiated paging, the UE ID used in the Paging message is the I-RNTI (which is assigned by the anchor gNB). The same Paging message is used over the radio interface for both CN initiated and RAN initiated paging, so the type of UE ID is what informs the UE of whether the CN or the RAN initiated the page. The UE needs to know this since it is expected to act differently depending on which entity that initiated the page. In response to CN initiated paging (excluding ETWS/CMAS/SI update notification) the UE is expected to contact the network (through random access) and request establishment of a new RRC connection (including a NAS Service Request message). In response to RAN initiated paging (excluding ETWS/CMAS/SI update notification) the UE is expected to contact the network (through random access) and request to resume an existing (suspended) RRC connection. Another difference between LTE and NR is that the maximum number of UE IDs (i.e. paging records) that may be included in a Paging message will be increased from 16 in LTE to 32, in NR.

As mentioned above, in NR, paging has to be transmitted using beamforming transmission on high carrier frequencies, e.g. multi-GHz frequencies, especially on really high frequencies, such as frequencies above 20 GHz and hence beam sweeping has to be used to cover an entire cell with the page. To support beam sweeping of paging transmissions, a paging occasion (PO) in NR can consist of multiple timeslots to accommodate all the paging transmissions of the beam sweep. This is configured in the system information.

In NR, a paging occasion is thus a regularly recurring time window during which paging may be transmitted. Different UEs can be allocated to different POs and a UE is expected to monitor the paging channel (i.e. the PDCCH configured for paging) during its allocated PO. A radio frame that has one or more PO(s) associated with it is denoted Paging Frame (PF).

In both LTE and NR, the time interval between two POs for a certain UE is governed by a paging DRX cycle (henceforth referred to as "DRX cycle"), i.e. there is one PO allocated to the UE during each DRX cycle (the UE may be aware of all POs, but "selects" one based on its UE ID). Unless the UE is configured with an extended DRX (eDRX) cycle, the DRX cycle a UE uses is the shortest of the default DRX cycle (also referred to as the default paging cycle), which is announced in the system information (then denoted defaultPagingCycle), or a UE specific DRX cycle negotiated with the CN. For regular UEs (i.e. UEs which are not configured with any type of extended DRX (eDRX) cycle), the shortest of the default DRX cycle and the UE specific DRX cycle (if available) is used. In NR, a UE can also be configured with a DRX cycle to be used in RRC_INACTIVE state. This DRX cycle is assigned to the UE when the UE is moved to RRC_INACTIVE state.

Within the DRX cycle, a UE calculates a PF and which out of possibly multiple (1, 2 or 4) PO(s) associated with the PF it should monitor based on its UE ID. In LTE, IMSI mod 1024 is used for this calculation but for NR, due to security/privacy issues related to the use of the IMSI for this purpose, the IMSI has been replaced by the 5G-S-TMSI in this formula.

In LTE it was simple to map a PO to a subframe and this could easily be done through a table specified for this purpose. However, in NR a PO cannot simply be mapped to a subframe. In terms of transmission resources, a subframe is an unambiguous concept in LTE (with the only variation being normal or extended cyclic prefix). In NR, on the other hand, the transmission resources (in terms of slots and hence OFDM symbols) vary with different numerologies (i.e., subcarrier spacings, SCSs). In addition, the duration required for a PO in NR is variable and depends the number of beams needed in a possible beam sweep for the PDCCH for paging in combination with the SCS and consequent symbol length. For these reasons, the table-based PO configuration mechanism of LTE has been replaced by a mechanism based on the pagingSearchSpace in NR. The Ns and i_s parameters of LTE are retained (where Ns is the number of POs associated with a PF and i_s is an index calculated based on the UE ID), but they no longer point out subframes in a paging frame, but rather sets of PDCCH monitoring occasions (constituting PDCCH beam sweeps) associated with a PF. Contrary to the case of LTE, the Ns parameter, which indicates the number of PO(s) associated with a PF is explicitly configured. The is parameter is an index pointing out one of the POs associated with a PF. It is calculated based on the UE ID in the same way as in LTE, i.e. i_s=floor(UE ID/N) mod Ns, where N is an explicitly configured parameter indicating the number of PFs in a DRX cycle.

The pagingSearchSpace configures a time domain pattern for so-called PDCCH monitoring occasions, at which a UE should monitor the PDCCH for paging transmissions (i.e. a DCI with a CRC scrambled with the P-RNTI) in the Control Resource Set (CORESET) configured for paging, which is associated with the pagingSearchSpace (the ControlResourceSetId of the associated CORESET is one of the SearchSpace parameters). The pagingSearchSpace is one instance of the SearchSpace IE (as defined in TS 38.331) and it contains the following parameters that define the time domain pattern for the PDCCH monitoring occasions:

monitoringSlotPeriodicityAndOffset. This parameter defines a combination of periodicity and offset for slots containing PDCCH monitoring occasions. The two "parts" will henceforth often be referred to as the "monitoring slot periodicity" and the "monitoring slot offset". A slot containing one or more PDCCH monitoring occasion(s) is denoted "monitoring slot".

The monitoring slot periodicity is often referred to as the "search space periodicity". With this alternative term a notion is associated by which the recurring pattern of PDCCH monitoring occasions configured by the duration and monitoringSymbolsWithinSlot parameters constitute one search space and thus this search space recurs with a periodicity equal to the monitoring slot periodicity (i.e. with "search space periodicity" with an alternative term).

monitoringSymbolsWithinSlot. This parameter configures a pattern of OFDM symbol(s) within a slot, where each indicated symbol is the first symbol of a PDCCH monitoring occasion, i.e. the first of a set of consecutive symbols in which the UE should monitor the CORESET associated with the PDCCH for paging. The length of each PDCCH monitoring occasion in terms of symbols is determined by the length of the associated CORESET. That is, starting from an OFDM symbol indicated by the monitoringSymbolsWithinSlot parameter, a PDCCH monitoring occasion consists of a set of M consecutive OFDM symbols, where M is equal to the duration (in symbols) of the CORESET associated with the pagingSearchSpace. The monitoringSymbolsWithinSlot parameter is a bitmap (or bit string) where each bit corresponds to a symbol in a slot. The most significant bit corresponds to the first symbol in the slot. A bit set to 1 indicates that the corresponding symbol is the first symbol of a PDCCH monitoring occasion. An OFDM symbol in which the UE should monitor the CORESET associated with the PDCCH for paging (i.e. an OFDM symbol belonging to a PDCCH monitoring occasion) is denoted "monitoring symbol".

The duration of a CORESET, i.e. the CORESET's number of consecutive symbols, is defined by the duration parameter in the ControlResourceSet IE. Note that this duration parameter should not be confused with the duration parameter in the SearchSpace IE. The duration parameter in the ControlResourceSet IE has the range 1-3.

duration. This parameter defines a number of consecutive slots in which the monitoring symbol pattern of the monitoringSymbolsWithinSlot parameter is repeated. The duration parameter thus configures a group of monitoring slots (with the same monitoring symbol pattern) starting at the slot defined by the monitoring slot offset part of the monitoringSlotPeriodicityAndOffset parameter. The group of monitoring slots is repeated with the periodicity defined by the monitoring slot periodicity part of the monitoringSlotPeriodicityAndOffset parameter. For instance, if the monitoring slot offset=0, the monitoring slot periodicity=4 and duration=2, then the UE applies the PDCCH monitoring symbol pattern of the monitoringSymbolsWithinSlotparameter in slots 0, 1, 4, 5, 8, 9 . . . (This slot numbering starts at the first slot in the first radio frame in the system frame number range, i.e. a radio frame with system frame number (SFN) 0).

FIG. 1B indicates the ASN.1 specifications for these parameters in 3GPP TS 38.331.

The CORESET indicates the DL transmission resources a UE should monitor during a PDCCH monitoring occasion. More specifically, a CORESET indicates a set of PRBs in the frequency domain and 1-3 consecutive OFDM symbols in the time domain. The length of a PDCCH monitoring occasion is thus defined by the length (number of OFDM symbols) of the CORESET. For instance, if the length of the CORESET is 3 symbols and the monitoringSymbolsWithinSlot parameter (which is a bitmap) indicates the second symbol of a slot as the first symbol of a PDCCH monitoring occasion, then the UE should monitor the CORESET in the second, third and fourth symbol of the slot. Furthermore, as mentioned above, each of those OFDM symbols is denoted "monitoring symbol" or "monitoring OFDM symbol" and a slot containing at least one monitoring symbol is denoted "monitoring slot". The CORESET associated with the PDCCH for paging is indicated by the controlResourceSetId parameter in the above ASN.1 SearchSpace definition.

Further details on the use of the search space parameters can be found in TS 38.213, where the following is stated in section 10.1 (in version 15.1.0 of the specification):

"For search space set s in control resource set P, the UE determines that a PDCCH monitoring occasion(s) exists in a slot with number $n_{s,f}^\mu$ [TS 38.211] in a frame with number $$n_f \text{ if } (n_f \cdot N_{slot}^{frame,\mu} + n_{s,f}^\mu - o_{p,s}) \bmod k_{p,s} =$$
$$0(n_f N_{slot}^{frame,\mu} + n_{s,f}^\mu - o_{p,s}) \bmod k_{p,s} = 0."$$

In this formula $k_{p,s}$ is the monitoring slot periodicity, $o_{p,s}$ is the monitoring slot offset and the other parameters are defined in TS 38.211 as follows:

$N_{slot}^{frame,\mu}$ Number of slots per frame for subcarrier spacing configuration μ (see clause 4.3.2 in TS 38.211)

$n_{s,f}^\mu$ Slot number within a frame for subcarrier spacing configuration μ (see clause 4.3.2 in TS 38.211)

μ Subcarrier spacing configuration, $\Delta f=2^\mu \cdot 15$ [kHz]

In NR, two main cases are distinguished: the so-called default case and the non-default case. This refers to whether there is an explicit pagingSearchSpace parameter structure configured through the system information (or dedicated signaling). If no such pagingSearchSpace parameter structure is available, a default allocation of the PO(s) associated with a PF is used. That is, in the default case, the PDCCH monitoring occasions corresponding to the PO(s) associated with a PF are determined according to a default association in relation to the SSB transmissions and these PDCCH monitoring occasions are then the same as for the RMSI as defined in section 13 in 3GPP TS 38.213. For the default case there can be 1 or 2 PO(s) in a PF (i.e. Ns can be equal to 1 or 2). If there are 2 POs in the PF, there is one PO in the first half frame (corresponding to i_s=0) and one PO in the second half frame (corresponding to i_s=1).

For the non-default case (i.e. with the pagingSearchSpace explicitly configured and the pagingSearchSpace parameter included in the RMSI/SIB1 or dedicated signaling) a different approach is used. An important difference from LTE is that the POs are not necessarily confined to the PF, but can (depending on the configuration) extend beyond the end of the PF. Furthermore, an additional parameter involved in the PO calculation has been introduced in NR, i.e. the firstPDCCH-MonitoringOccasionOfPO parameter. This parameter, which is optional, contains one value for each of the (1, 2 or 4) PO(s) associated with the PF. This value points out the first PDCCH monitoring occasion of PO. If the optional firstPDCCH-MonitoringOccasionOfPO parameter is not configured, first PDCCH monitoring occasion of the first PO associated with the PF is the first PDCCH monitoring occasion following the start of the PF, as configured by the pagingSearchSpace, and first PDCCH monitoring occasion of the second PO (if any) is the first PDCCH monitoring occasion following the first PO and so forth. Each PO consist of the same number of PDCCH monitoring occasions as the number of SSBs (i.e. typically the number of SSB beams) used in the cell. Note that in this calculation, PDCCH monitoring occasions overlapping with UL symbols are disregarded/ignored. For the non-default case, there can be 1, 2 or 4 POs associated with a PF (i.e. Ns can be equal to 1, 2 or 4).

FIG. 1C indicates the ASN.1 specification of the firstPDCCH-MonitoringOccasionOfPO parameter in TS 38.331.

The following is the most recent text describing the PF and PO calculation in section 7.1 in TS 38.304 (still subject to editing, for instance, "paging-SearchSpace" will be changed to "pagingSearchSpace")

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDMsymbol) where paging DCI can be sent [4]. One Paging Frame (PF) is one Radio Frame and may contain one or multiple PO(s) or starting point of a PO.

In multi-beam operations, the UE can assume that the same paging message is repeated in all transmitted beams and thus the selection of the beam(s) for the reception of the paging message is up to UE implementation.

The paging message is same for both RAN initiated paging and CN initiated paging. The UE initiates RRC Connection Resume procedure upon receiving RAN initiated paging. If the UE receives a CN initiated paging in RRC_INACTIVE state, the UE moves to RRC_IDLE and informs NAS.

The PF and PO for paging are determined by the following formulae:

17 SFN for the PF is determined by:
1. (SFN+PF_offset) mod T=(T div N)*(UE ID mod N)
2. Index (i_s), indicating the start of a set of PDCCH monitoring occasions for the paging DCI, is determined by:
3. i_s=floor (UE ID/N) mod Ns The PDCCH monitoring occasions for paging are determined according to paging-SearchSpace (TS 38.213 [4] section 10) and firstPDCCH-MonitoringOccasionOfPO if configured. When SearchSpaceId=0 is configured for paging-SearchSpace, the PDCCH monitoring occasions for paging are same as for RMSI as defined in Section 13 in TS 38.213 [4]).

When SearchSpaceId=0 is configured for paging-SearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for paging-SearchSpace, the UE monitors the $(i\_s+1)^{th}$ PO. A PO is a set of 'S' consecutive PDCCH monitoring occasions where 'S' is the number of actual transmitted SSBs determined according to ssb-PositionsInBurst in SystemInformationBlock1. The $K^{th}$ PDCCH monitoring occasion for paging in the PO corresponds to the $K^{th}$ transmitted SSB. The PDCCH monitoring occasions for paging which do not overlap with UL symbols are sequentially numbered from zero starting from the $1^{st}$ PDCCH monitoring occasion in the PF. When firstPDCCH-MonitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter; otherwise, it is equal to i_s*S.

NOTE: For non-default association, PDCCH monitoring occasions for a PO can span multiple radio frames and multiple periods of the paging search space.

The following parameters are used for the calculation of PF and i_s above:

T: DRX cycle of the UE (T is determined by the shortest of the UE specific DRX value, if configured by RRC or upper layers, and a default DRX value broadcast in system information. If UE specific DRX is not configured by RRC or by upper layers, the default value is applied.)

N: number of total paging frames in T
Ns: number of paging occasions for a PF
PF_offset: offset used for PF determination
UE_ID: 5G-S-TMSI mod 1024

Parameters N, Ns, first-PDCCH-MonitoringOccasionOfPO, PF_offset, and the length of default DRX Cycle are signaled in SIB1.

If the UE has no 5G-S-TMSI, for instance when the UE has not yet registered onto the network, the UE shall use as default identity UE_ID=0 in the PF and i_s formulas above.

5G-S-TMSI is a 48-bit long bit string as defined in [10]. 5G-S-TMSI shall in the formulae above be interpreted as a binary number where the left most bit represents the most significant bit.

NR in Unlicensed Spectrum

For LTE, 3GPP has moved, as a sidetrack, from the realm of licensed spectrum and specified a standard for LTE based communication in unlicensed spectrum, i.e., co-existing with other systems, such as Wi-Fi. For LTE, this is enabled only in tight interworking (i.e., carrier aggregation) with a system using licensed spectrum (i.e. regular LTE). The LTE based communication in unlicensed spectrum in this manner is labeled License-Assisted Access (LAA). 3GPP continues its venture into the realm of unlicensed spectrum for NR and for NR, such a system is denoted NR Unlicensed (NR-U). NR-U will be specified both for tight interworking (e.g., dual connectivity) with a regular NR system and as a stand-alone system. The coexistence with other systems (and other NR-U systems/cells) in unlicensed spectrum requires a different kind of operation on the physical layer than in regular NR in licensed spectrum, including e.g. the Listen Before Talk (LBT) principle, e.g., using Clear Channel Assessment (CCA), where a gNB or UE listens to the radio channel to verify that it is clear (unused) before accessing the medium for transmission (more about this below). The essentially uncoordinated operation of different systems in unlicensed spectrum also makes it more prone to destructive interference.

For a node (e.g., NR-U gNB/UE, LTE-LAA eNB/UE, or Wi-Fi AP/STA)) to be allowed to transmit in unlicensed spectrum (e.g., 5 GHz band) it typically needs to perform a clear channel assessment (CCA). This procedure typically includes sensing the medium to be idle for a number of time intervals. Sensing the medium to be idle can be done in different ways, e.g. using energy detection, preamble detection or using virtual carrier sensing. Where the latter implies that the node reads control information from other transmitting nodes informing when a transmission ends. After sensing the medium to be idle, the node is typically allowed to transmit for a certain amount of time, sometimes referred to as transmission opportunity (TXOP). The length of the TXOP depends on regulation and type of CCA that has been performed, but typically ranges from 1 ms to 10 ms. This duration is often referred to as a COT (Channel Occupancy Time).

In Wi-Fi, feedback of data reception acknowledgements (ACKs) is transmitted without performing clear channel assessment. Preceding feedback transmission, a small time duration (called Short Interframe Space, SIFS) is introduced between the data transmission and the corresponding feedback which does not include actual sensing of the channel. In 802.11, the SIFS period (16 μs for 5 GHz OFDM PHYs) is defined as:

aSIFSTime=aRxPHYDelay+aMACProcessingDelay+ aRxTxTurnaroundTime aRxPHYDelay defines the duration needed by the PHY layer to deliver a packet to the MAC layer aMACProcessingDelay defines the duration that the MAC layer needs to trigger the PHY layer transmitting a response aRxTxTurnaroundTime defines the duration needed to turn the radio from reception into transmit mode Therefore, the SIFS duration is used to accommodate for the hardware delay to switch the direction from reception to transmission.

It is anticipated that for NR in unlicensed bands (NR-U), a similar gap to accommodate for the radio turnaround time will be allowed. For example, this will enable the transmission of PUCCH carrying UCI feedback as well as PUSCH carrying data and possible UCI within the same transmit opportunity (TXOP) acquired by the initiating gNB without the UE performing clear channel assessment before PUSCH/PUCCH transmission as long as the gap between DL and UL transmission is less than or equal to 16 μs. Another option in case the gap is larger than 16 μs is for the UE to perform a short 25 μs CCA. Operation in this manner is typically called "COT sharing."

FIG. 2 illustrates a TXOP both with and without COT sharing after CCA is successful at the gNB. The particular illustrated example depicts transmission opportunities (TXOP) both with and without COT sharing where CCA is performed by the initiating node (gNB) in the case of COT sharing the gap between DL and UL transmission is less than 16 μs.

SUMMARY

The lack of full control of the radio channel impacts virtually every aspect of the network's operations involving radio interface transmissions. In the context of this disclosure, the most relevant aspect is paging and transmission of paging DCI and paging messages to UEs. In the study item on NR-U in 3GPP it is proposed to provide additional paging transmission opportunities to compensate for CCA/LBT failures.

There currently exist certain challenges. For example, increasing the number of paging transmission opportunities in the time domain is a way to increase the probability that paging of a UE is not blocked by an occupied channel (i.e. CCA/LBT failure). However, increased number of possible paging transmission opportunities also increases the UE's effort to monitor the paging channel (i.e. monitoring the PDCCH used for paging), thus increasing the UE's energy consumption. Techniques that take this tradeoff into account, compromising between them or giving higher weight to either side of the tradeoff, are described herein.

In particular, certain aspects of the present disclosure and their embodiments may provide solutions to these or other challenges by, for example, enabling compensation for CCA failure in conjunction with paging by providing additional transmission opportunities for paging using a paging window with configured transmission opportunities for paging. In the manner this surplus of transmission opportunities is utilized, different weight can be given to short time to complete a paging beam sweep on one hand and a UE's ability to predict exactly when a certain beam direction may be transmitted. Accordingly, there is disclosed herein various variants of how a surplus of paging transmission opportunities (e.g., more than the nominal number of needed transmissions, which is equal to the number of SSBs in the cell) can be configured and utilized to compensate for CCA failure. Some embodiments take into account that a UE should be able to determine exactly when the paging will be transmitted in a certain beam direction, so that the UE can limit its page monitoring to only a certain beam direction, which the UE may have selected, e.g. based on previous SSB/DRS measurements. Other embodiments prioritize to reattempt failed beam transmissions without wasting any transmission opportunities, at the cost of lost predictability of when a certain beam direction will be transmitted. Some embodiments balance the two.

According to an embodiment, a method is provided for use in a network node in wireless communications network. The method includes determining a plurality of transmission opportunities, TXOPs, in which to attempt to transmit a paging signal in a plurality of beams. The plurality of beams have a beam order. The method further includes assigning a predetermined number of the plurality of TXOPs to each beam of the plurality of beams, wherein none of the TXOPs is assigned to more than one beam. The method further includes performing at least one clear channel assessment, CCA, before transmitting the paging signal in one of the TXOPs. The method further includes transmitting the paging signal in a first beam of the plurality of beams using one of the plurality of TXOPs assigned to the first beam based on a first successful CCA covering the used TXOP.

According to another embodiment, a computer program product includes a non-transitory computer readable medium storing computer readable program code. The computer readable program code comprises program code operable to perform the above method.

According to yet another embodiment, a network comprises a memory configured to store instructions and processing circuitry configured to execute the instructions. The network node is configured to determine a plurality of transmission opportunities, TXOPs, in which to attempt to transmit a paging signal in a plurality of beams. The plurality of beams have a beam order. The network node is further configured to assign a predetermined number of the plurality of TXOPs to each beam of the plurality of beams, wherein none of the TXOPs is assigned to more than one beam. The network node is further configured to perform at least one clear channel assessment, CCA, before transmitting the paging signal in one of the TXOPs. The wireless device is further configured to transmit the paging signal in a first beam of the plurality of beams using one of the plurality of TXOPs assigned to the first beam based on a first successful CCA covering the used TXOP.

In certain embodiments, the method/network node/computer program product may have one or more additional and/or optional features, such as one or more of the following:

In particular embodiments, in response to a failed CCA preventing the transmission of the paging signal in one of the TXOPs assigned to a first beam, a later available TXOP of the plurality of TXOPs assigned to the first beam is used to attempt the transmission of the paging signals.

In particular embodiments, assigning a predetermined number of the plurality of TXOPs to each beam of the plurality of beams comprises assigning at least a first sequence of TXOPs of the plurality of TXOPs to the plurality of beams in same order as the beam order.

In particular embodiments, the method/network node/computer program product further comprises performing a first CCA, the first CCA covering each TXOP in the first sequence of TXOPs. In certain embodiments, a determination is made whether the first CCA is successful or unsuccessful. In response to determining that the first CCA is successful, the paging signal is transmitted on each of the plurality of beams using each of the first sequence of TXOPs. In response to determining that the first CCA is unsuccessful, the method/network node/computer program product abstains from transmitting the paging signal on any of the plurality of beams using any of the first sequence of TXOPs.

In particular embodiments, the method/network node/computer program product further comprises performing a first CCA after at least one TXOP of the first sequence of TXOPs has passed. The first CCA covers each remaining TXOP in the first sequence of TXOPs. In response to the first CCA being successful, the paging signal is transmitted at least on each of a plurality of remaining beams using each of the remaining TXOPs in the first sequence of TXOPs. The plurality of remaining beams are beams of the plurality of beams to which the remaining TXOPs in the first sequence of TXOPs have been assigned.

In particular embodiments, assigning a predetermined number of the plurality of TXOPs to each beam of the plurality of beams further comprises assigning a second sequence of TXOPs of the plurality of TXOPs to the plurality of beams in the same order as the beam order. The first TXOP of the second sequence of TXOPs corresponds to the TXOP in the plurality of TXOPs that follows directly after the last TXOP of the first sequence of TXOPs.

In particular embodiments, the method/network node/computer program product further comprises performing a first CCA after at least one TXOP of the first sequence of TXOPs has passed. The first CCA covers each remaining TXOP in the first sequence of TXOPs and at least one TXOP of the second sequence of TXOPs. In response to the first CCA being successful, the paging signal is transmitted using each of the remaining TXOPs in the first sequence of TXOPs and the least one TXOP of the second sequence of TXOPs. In particular, each of the remaining TXOPs in the first sequence of TXOPs is used to transmit the paging signal on each of a plurality of remaining beams using. The plurality of remaining beams are beams of the plurality of beams to which the remaining TXOPs in the first sequence of TXOPs have been assigned. In certain embodiments, the at least one TXOP of the second sequence of TXOPs contains a number of sequential TXOP(s) equal to the number of beams in the plurality of beams that were not transmitted in the TXOPs of the first sequence of TXOPs.

In particular embodiments, the method/network node/computer program product further comprises attempting to transmit on all TXOPs of the plurality of TXOPs assigned to the first beam regardless of a previous success of transmitting the paging signal on the first beam in a previous TXOP assigned to the first beam.

In particular embodiments, the method/network node/computer program product further comprises using one of the plurality of TXOPs to transmit a signal other than the paging signal.

In particular embodiments, the method/network node/computer program product further comprises obtaining a configuration indicating to the network node how to transmit the paging signal using the plurality of TXOPs.

In particular embodiments, the plurality of TXOPs correspond to Physical Downlink Control Channel, PDCCH, transmission opportunities that do not overlap with uplink symbols.

In particular embodiments, the beam order follows an index based on a detected synchronization signal block.

In particular embodiments, the method/network node/computer program product further comprises reusing one the at least one CCA for more than one actual transmissions using the plurality of TXOPs.

In particular embodiments, the method/network node/computer program product further comprises transmitting the paging signal a second time on the same beam.

In particular embodiments, the method/network node/computer program product further comprises mapping a plurality of synchronization signal block beams to the plurality of beams used for the paging signal, wherein the number of synchronization signal block beams is greater than the number of the plurality of beams used for the paging signal.

According to an embodiment, a method is provided for use in a wireless device in a wireless communications network. The method comprises determining a plurality monitoring occasions in which a network node may attempt to transmit a paging signal in a plurality of beams. The plurality of beams have a beam order, and each monitoring occasion of the plurality of monitoring occasions is assigned to a respective beam of the plurality of beams sequentially according to the beam order. Each beam of the plurality of beams is assigned a predetermined number of the plurality of monitoring occasions. The method further comprises monitoring at least a subset of monitoring occasions of the plurality of monitoring occasions for the paging signal. The method further comprises receiving the paging signal in a first beam of the plurality of beams using one or more of the monitoring occasions being monitored by the wireless device. Note that in this context, from the perspective of the wireless device, a TXOP for the network node (e.g., an opportunity for the network node to transmit a page indication or a paging message) corresponds to a monitoring occasion for the wireless device, such as a PDCCH monitoring occasion in which the wireless device monitors a PDCCH for a paging transmission from the network node. In particular, the paging transmission on the PDCCH may be a Downlink Control Information (DCI) message with a downlink scheduling allocation for a Radio Resource Control (RRC) Paging message on a Physical Downlink Shared Channel (PDSCH) and/or an indication of a system information update and/or a Public Warning System (PWS) indication (e.g. activation of the Earthquake and Tsunami Warning System (ETWS) or Commercial Mobile Alert System (CMAS)).

According to another embodiment, a computer program product includes a non-transitory computer readable medium storing computer readable program code. The computer readable program code comprises program code operable to perform the method immediately above.

According to another embodiment, a wireless device comprises a memory configured to store instructions and processing circuitry configured to execute the instructions. The wireless device is configured to determine a plurality of monitoring occasions in which a network node may attempt to transmit a paging signal in a plurality of beams. The plurality of beams have a beam order, and each monitoring occasion of the plurality of monitoring occasions is assigned to a respective beam of the plurality of beams sequentially according to the beam order. Each beam of the plurality of beams is assigned a predetermined number of the plurality of monitoring occasions. The wireless device is further configured to monitor at least a subset of monitoring occasions of the plurality of monitoring occasions for the paging signal. The wireless device is further configured to receive the paging signal in a first beam of the plurality of beams using one or more of the monitoring occasions configured to be monitored by the wireless device.

In certain embodiments, the method/wireless device/computer program product may have one or more additional and/or optional features, such as one or more of the following:

In particular embodiments, the monitoring occasions being monitored by the wireless device comprise a predetermined number of the plurality of monitoring occasions assigned to the first beam. Optionally, in certain embodiments, the predetermined number of the plurality of monitoring occasions assigned to the first beam are equally spaced within the sequence of the plurality of monitoring occasions.

In particular embodiments, the plurality of monitoring occasions are divided equally into subsets where each of the subsets is associated with a different one of the plurality of beams and each of the subsets is defined to include the monitoring occasions assigned to the beam associated with the subset which are defined to include the (X*S+K)th monitoring occasions, where S is the total number of beams in the plurality of beams and K is the number of the beam in the plurality of beams which is associated with the subset and the subset comprises one monitoring occasion for each value of X for X equal to zero and each integer value between zero and the predetermined number minus one. In particular embodiments, the monitoring occasions being monitored by the wireless device comprise the subset of monitoring occasions associated with the first beam of the plurality of beams.

In particular embodiments, the method/wireless device/ computer program product further comprises receiving a signal other than the paging signal on one of the monitoring occasions being monitored by the wireless device.

In particular embodiments, the beam order follows an index based on a detected synchronization signal block.

In particular embodiments, the method/wireless device/ computer program product further comprises receiving the paging signal in the first beam using more than one of the monitoring occasions being monitored by the wireless device.

In particular embodiments, the plurality of monitoring occasions are Physical Downlink Control Channel, PDCCH, monitoring occasions that do not overlap with uplink symbols.

In particular embodiments, the method/wireless device/ computer program product further comprises determining the at least a subset of monitoring occasions to monitor based on configuration information received from the wireless communications network. In certain embodiments, the at least a subset of monitoring occasions to monitor is determined based on a previously received subset of synchronization signal block transmissions or a previously received subset of synchronization signal transmissions.

Certain embodiments may provide one or more of the following technical advantages. For example, certain embodiments provide the network additional opportunities to compensate for CCA failures that may have blocked paging transmissions in one or more beam directions. As another example, certain embodiments utilize predictability of when the paging will be transmitted in a certain beam direction to limit the amount of monitoring of the UE for paging signals. In particular, in some embodiments, the UE may limit its page monitoring to only a certain beam direction that the UE may have selected, e.g. based on previous SSB/DRS measurements.

Certain embodiments may have one or more of the technical advantages. Certain embodiments may have none, some, or all of the above-recited advantages. Other advantages may be readily apparent to one having skill in the art.

BRIEF DESCRIPTION OF THE DRAWINGS

For a more complete understanding of the disclosed embodiments and their features and advantages, reference is now made to the following description, taking in conjunction with the accompanying drawings, in which:

FIG. 1B illustrates the ASN.1 specifications for the parameter pagingSearchSpace as an example instance of the SearchSpace information as defined in 3GPP TS 38.331, in accordance with certain embodiments;

FIG. 1C illustrates the ASN.1 specification of the firstPDCCH-MonitoringOccasionOfPO parameter in TS 38.331, in accordance with certain embodiments;

DETAILED DESCRIPTION

Figure 1A:
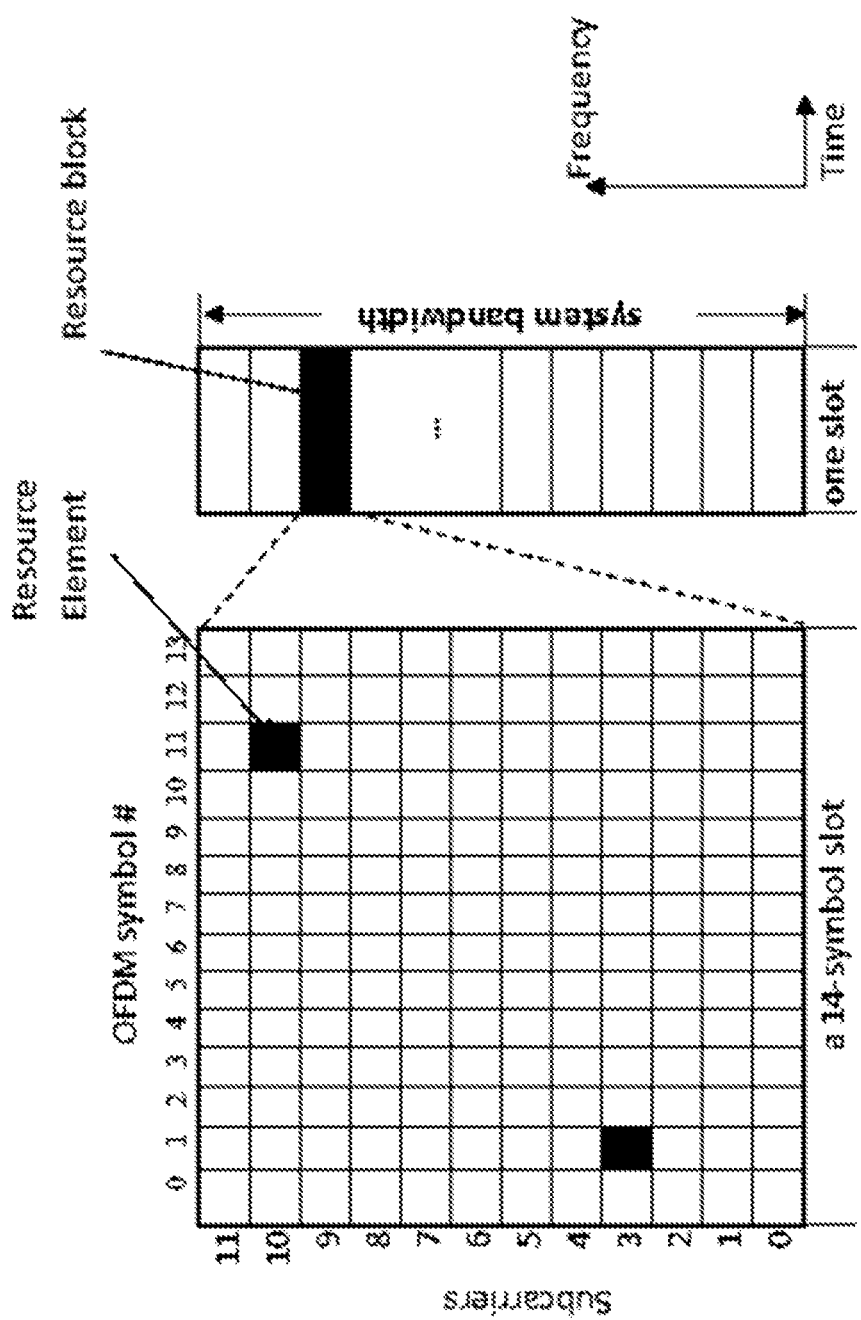
FIG. 1A illustrates an example of a resource element grid, in accordance with certain embodiments.
Figure 2:
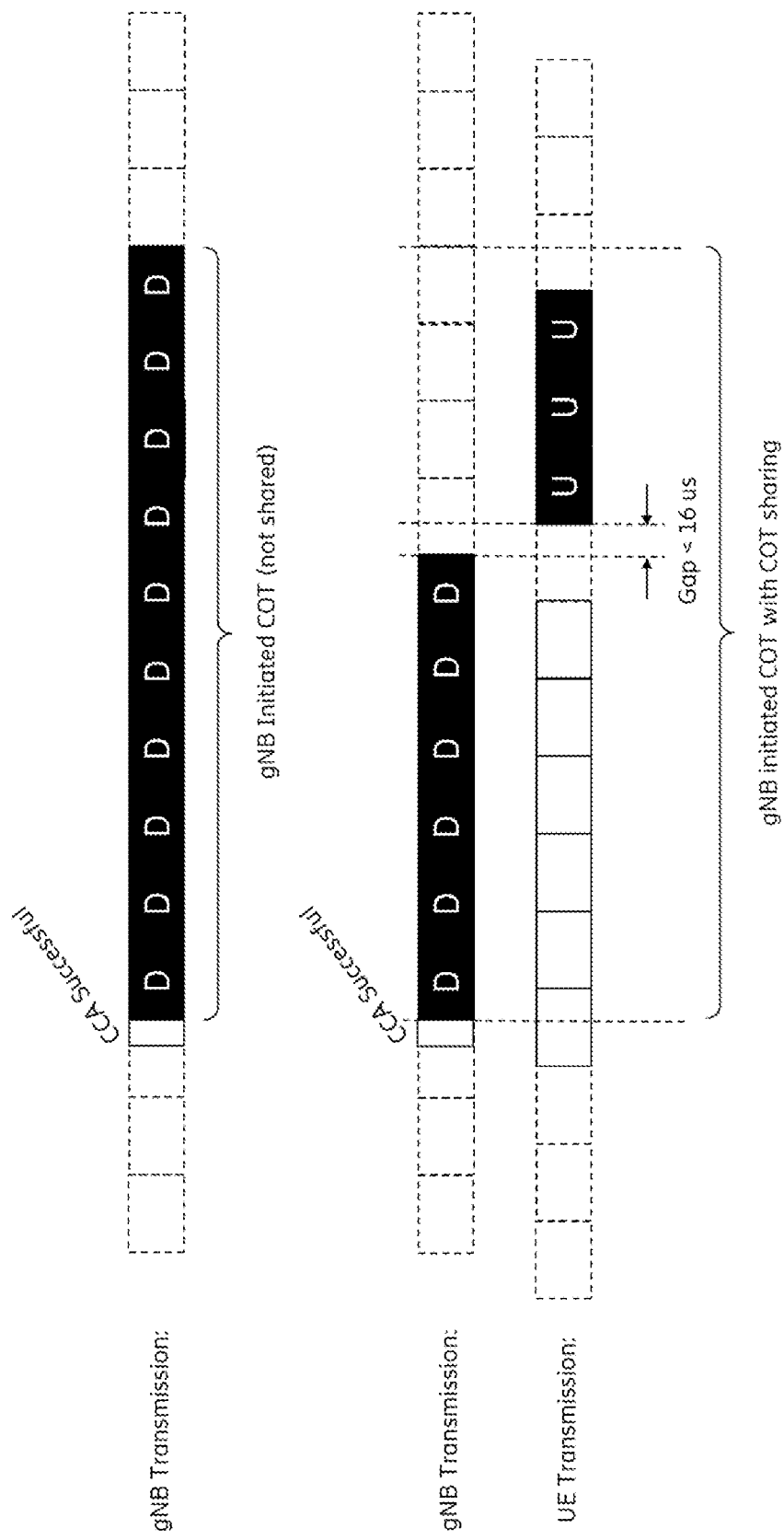
FIG. 2 illustrates an example transmission opportunity in two configurations, with and without Channel Occupancy Time sharing after a successful clear channel assessment, according to certain embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Having a surplus of paging transmission opportunities (e.g., more than the nominal number of needed transmissions, which is equal to the number of SSBs in the cell) during a period of time where a wireless device, such as a User Equipment (UE), is expected to monitor the DL for paging is a way to allow the network (e.g., a gNB) to compensate for potential CCA failures. Since not all transmission opportunities (TXOPs) will typically be utilized, e.g., only one successful paging transmission for each SSB will typically be used (although variations are described herein where multiple paging transmissions for a single SSB may occur), this implies a window within which these transmission opportunities are confined. This window could be seen as the UE's paging occasion (PO), thereby modifying the PO definition used in NR. Note that, in NR, a paging occasion is a set of consecutive PDCCH monitoring occasions, excluding PDCCH monitoring occasions overlapping with UL symbols, equal in number to the number of actually transmitted SSBs in the cell. The window could thus be referred as the "paging window", the "paging occasion (PO) window" or just the "window".

The network (e.g., using a network node, gNB) can utilize the transmission opportunities in different ways, e.g., there are different ways to use the transmission opportunities to compensate for CCA failures. One aspect which is affected by this choice is the UE's ability to predict when the paging will be transmitted in a certain beam direction. This may be useful for a UE that wishes to monitor only a single beam direction, e.g., based on previously acquired knowledge of the best beam (such as it being acquired from SSB/DRS reception). This is also connected to another affected aspect, which is the UE's required potential monitoring time as well as its possibilities for micro-sleep periods within the window. Note that in this context a transmission opportunity (TXOP) is a transmission opportunity for the network node, e.g. gNB, wherein the network node may transmit a page indication or a paging message. From the perspective of the wireless device, a TXOP for the network node to transmit paging corresponds to a PDCCH monitoring occasion for the wireless device, i.e. an occasion in which the wireless device monitors a PDCCH for a paging transmission from the network node. In particular, the paging transmission on the PDCCH may be a Downlink Control Information (DCI) message with a downlink scheduling allocation for a Radio Resource Control (RRC) Paging message on a Physical Downlink Shared Channel (PDSCH) and/or an indication of a system information update and/or a Public Warning System (PWS) indication (e.g. activation of the Earthquake and Tsunami Warning System (ETWS) or Commercial Mobile Alert System (CMAS)).

In the embodiment descriptions below, the TXOPs and the paging transmissions may refer to only the PDCCH transmission or both the PDCCH transmission and the associated PDSCH transmission. Note that with flexible scheduling mechanisms a PDSCH does not have to be transmitted in direct conjunction with the PDCCH transmission that scheduled it. A PDSCH transmission for paging may even be transmitted outside the PO window.

Also, in some cases, there will be no PDSCH transmission associated with a PDCCH transmission, e.g., if the DCI transmitted on the PDCCH is used only to notify the UEs about system information updates or Public Warning System (e.g., ETWS or CMAS) transmission activation.

In the description of certain embodiments below, the term $N_{beam}$ denotes the number of beams used for the paging transmissions, which may refer to the number of beam directions, which may also be the same as the number of SSBs or SSB/DRS beams used in the cell. Note however, that the embodiments described under the section "Embodiment 16" the number of SSBs and the number of paging transmissions are not the same.

Embodiment 1

According to a first set of embodiments, starting from the first TXOP in the paging window a network node, e.g., a gNB, performs CCA for every TXOP and, upon success, transmits the next (not yet successfully transmitted) beam in sequence (e.g., following the same beam direction sequence as the SSB transmissions, e.g., as in an SSB Burst Set, or a DRS beam sweep). The gNB may continue this process until all beam directions have been covered (i.e., paging has been transmitted in all beam directions) or until all the TXOPs in the window have passed.

According to these embodiments, no TXOPs may be skipped (even though not all of them may be successfully utilized, e.g., due to CCA failure) and hence the full beam sweep, e.g., the complete set of paging transmissions, is completed as soon as possible. On the other hand, a wireless device, e.g., UE, in the paging area, may not be able to predict when a certain beam direction will be transmitted (with the possible exception that the first beam direction, which is QCL with the first SSB/DRS beam, according to the beam index). The lack of a predetermined or determinable mapping between TXOPs and the beam direction may also lack of any required relation between the number of TXOPs ($N_{TXOP}$) in the paging window and the number of beams directions ($N_{beam}$), as long as the $N_{TXOP} \geq N_{beam}$ (e.g., such that there is as least as many opportunities as the number of beams to be transmitted.

Embodiment 2

According to a second set of embodiments, a predetermined number (M) of sequential TXOPs are allocated to each beam. For instance, M sequential TXOPs are allocated to beam 1, followed by M sequential TXOPs allocated to beam 2, etc. In some embodiments, the gNB reattempts transmission of a certain beam until it is successfully transmitted or until the M TXOPs allocated to the beam have passed (i.e., all failed). In certain embodiments, the number of TXOPs is equal to the number of beams or SSBs multiplied by a number N=1, 2, . . . . In certain embodiments, the number M is equal to the number N, such that all of the TXOPs are equally allocated to the beams. In another embodiment, the number M is less than the number N or the number of TXOPs allocated to each beam is not equal for each beam.

Figure 3:
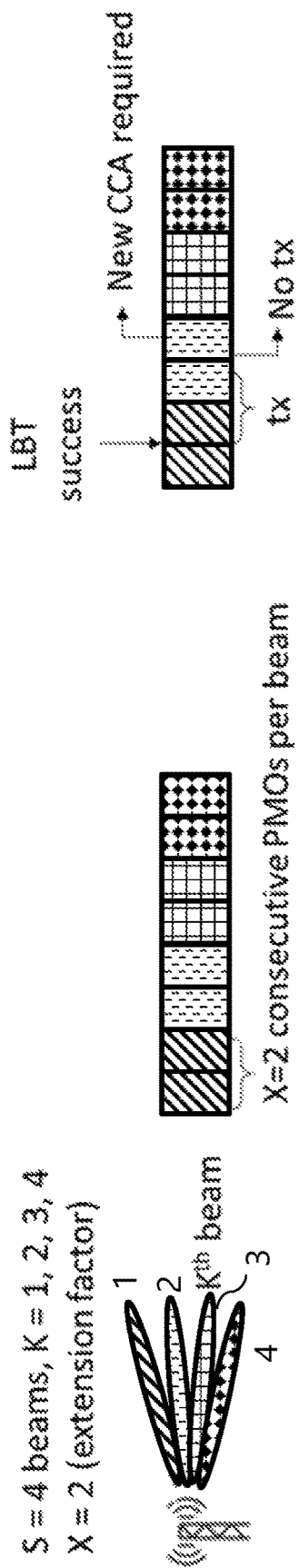
FIG. 3 illustrates a first example configuration of transmission opportunities for a set of beams used to transmit a paging signal from a network node, in accordance with certain embodiments.

FIG. 3 illustrates a particular example according to the second set of embodiments, where there are S=4 beams and the number of TXOPs is S multiplied by an extension factor X=2, which equals 8 total TXOPs. The 8 example TXOPs are illustrated on the left side of the illustration in their respective order corresponding to the different beams. In this set of embodiments, each X consecutive TXOPs are assigned to each beam, in the beam order. For X=2 and S=4, this means the first two TXOPs are assigned to the first beam, the third and fourth TXOPs are assigned to the second beam, the fifth and sixth TXOPs are assigned to the third beam, and the seventh and eight TXOPs are assigned to the fourth beam.

According to this set of embodiments, there is a predetermined mapping between a TXOP and the beam (and its direction). As a result, in certain embodiments, a UE may limit its monitoring time to a small subwindow, e.g., monitoring only the M TXOPs associated with a single beam direction (or M TXOPs for each set of beam directions the UE associates with). In some embodiments, the UE terminates the monitoring if a transmission is successfully received before the all of the M TXOPs have passed. In this manner, the UE may efficiently monitor and receive paging signals.

In certain optional embodiments, there may be more TXOPs available/configured in the window than the above-mentioned M TXOPs per beam direction (i.e., more than $M \times N_{beam}$, where $N_{beam}$ is the number of beams). In some embodiments, these additional TXOPs can then be used for further transmission reattempts of failed beams (if any). Such additional TXOPs may be used in different ways, e.g., in line with the principle of the first set of embodiments by repeatedly trying to transmit one beam direction until it succeeds and then go on with the next of the failed beams (if any) until all the gNB has successfully transmitted paging in all beam directions or all the TXOPs in the paging window have passed.

Embodiment 3

According to a third set of embodiments, there is a predetermined mapping between the TXOPs and the beams. In certain embodiments, a first set of $N_{beam}$ TXOPs are unambiguously mapped to the $N_{beam}$ beams in the same order as the corresponding SSB/DRS beams. In some embodiments, a subsequent $N_{beam}$ TXOPs form an identical set, with the same unambiguous mapping to SSB/DRS beams. Additional TXOPs may form yet another identical set.

In certain embodiments, the network node, gNB, first tries to transmit each paging beam once, one at a time, using the first set of TXOPs. If one or more of the beam transmissions fail(s), the gNB may reattempt transmission of this/these beam(s) using the second set. In some embodiments, the reattempts are only carried out for beam(s) that failed in the first set of TXOPs and may be transmitted using the TXOPs they are associated with in the second set of TXOPs. The other TXOPs in the second set of TXOPs (if any) may be left unused. In this manner, a predictable mapping between TXOP and beam direction.

Figure 4:
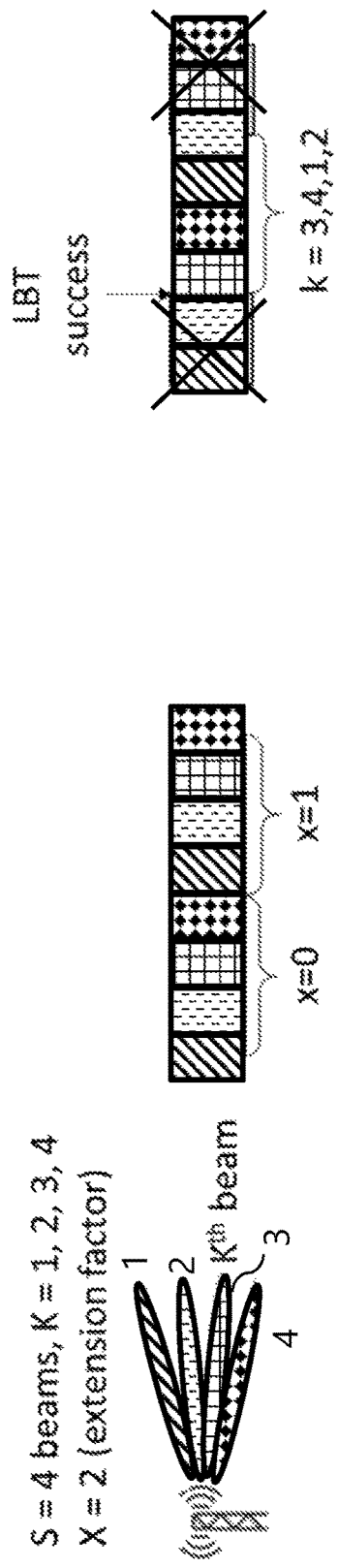
FIG. 4 illustrates a second example configuration of transmission opportunities for a set of beams used to transmit a paging signal from a network node, in accordance with certain embodiments.

FIG. 4 illustrates an illustrates a particular example according to the third set of embodiments, where there are S=4 beams and the number of TXOPs is S multiplied by an extension factor X=2, which equals 8 total TXOPs. The illustrated example shows how the TXOPs are assigned in the same beam order (1, 2, 3, 4) sequentially and the assignment repeated. Since in this example, there are 8 total TXOPs and 4 beams, the first and fifth TXOPs are assigned to the first beam, the second and sixth TXOPs are assigned to the second beam, the third and seventh TXOPs are assigned to the third beam, and the fourth and eight TXOPs are assigned to the fourth beam. In certain embodiments, consistent with some described above, if the first beam fails in the first TXOP, it may be reattempted in the fifth TXOP. Alternatively, if the first beam is successful in the first TXOP, the fifth TXOP may be skipped. In alternative embodiments, the fifth TXOP may be used for other signalling or for repeating the successful beam (as described in further detail below with reference to other embodiments).

The paging procedure according to these embodiments may continue until all beams have been successfully transmitted or all sets (with deterministic mapping between TXOP and beam direction) in the window have passed.

According to certain embodiments in the third set of embodiments, a wireless device, e.g., UE, can select a certain (best) beam (or multiple) to monitor, e.g., based on previous SSB/DRS measurements. Based on the predetermined mapping between TXOP and beam direction in the set(s) of TXOPs the UE may determine exactly at what times/time periods to monitor the paging channel in order to receive potential paging transmissions using the selected beam. That is, the UE may selectively only monitor one beam (or subset of beams) transmission in each set of TXOPs or until it receives the paging transmission (with sufficient quality). If the UE does not receive any paging transmission during this monitoring, and there are additional TXOPs in the window without predetermined mapping between TXOPs and beam directions, then the UE may monitor every remaining TXOP until it receives the paging transmission or all the TXOPs in the window have passed.

In certain embodiments, if the remaining TXOPs are not many enough to form such a set or if the number of TXOPs is not divisible by the number of beams, the extra TXOPs may be used for taking care of any still unsuccessfully transmitted beams, e.g. in a manner in line with the principle described above in the first set of embodiments (i.e., the gNB would keep trying to transmit one (yet not successfully transmitted) beam direction until it succeeds and then go on with the next of the failed beams (if any) until the gNB has successfully transmitted paging in all beam directions or all the TXOPs in the paging window have passed). Optionally, also the remaining TXOP(s) (if any) not forming a full set (i.e. which are fewer than the number of beams) may have a predetermined mapping between each TXOP and a certain beam. With this embodiment, the gNB has to honor this mapping if it utilizes any of these remaining TXOP(s) for paging transmission.

Embodiment 4

In certain embodiments, the paging window contains only a single set of TXOPs with predetermined mapping between TXOPs and beam directions and then a group of additional TXOPs without predetermined mapping between TXOP and beam direction. The number of TXOPs in the group of additional TXOPs may be fewer than, equal to, or greater than the number of beams (SSBs/DRSs) used in the cell (i.e., fewer than, equal to, or greater than the number of TXOPs in the set of TXOPs with predetermined mapping between TXOPs and beam directions). The group of additional TXOPs may be used to reattempt transmission of any not yet successfully transmitted beam(s).

For example, the gNB may first try to transmit each paging beam once, one at a time, using the set of TXOPs with predetermined mapping between TXOPs and beam directions (as in the third set of embodiments). If any beam fail(s), the gNB reattempts the beam(s) that failed in subsequent TXOPs without predetermined mapping between TXOP and beam direction. Since there is no predetermined mapping between the TXOPs and the beam directions, the reattempts may use sequential TXOPs without skipped TXOPs. This could be done consistently with the procedure discussed in the first set of embodiments, i.e., the gNB would keep trying to transmit one (yet not successfully transmitted) beam direction until it succeeds and then go on with the next of the failed beams (if any) until the gNB has successfully transmitted paging in all beam directions or all the TXOPs in the paging window have passed. Alternatively, the gNB may "sweep" through the failed beams with one TXOP each, and iterates the operation until all beams have been transmitted or the paging window ends (e.g., all the TXOPs in the window have passed).

Embodiment 5

In certain embodiments, the TXOPs are configured as one or more sets of TXOPs with predetermined mapping between TXOPs and beam directions, and optionally followed by a group of additional TXOPs which are fewer than the number of beams. Further, in some embodiments, the additional TXOPs (if any) which are fewer than the number of beams have predetermined mapping between TXOP and beam. This mapping is such that the first of the additional TXOPs maps to the first beam, the second TXOP maps to the second beam, etc., i.e., the additional TXOP together map to a partial beam sweep.

In certain embodiments, the TXOPs in a set are configured densely, e.g., with less than 16 μs gap between the TXOPs, such that the same CCA can be used for all the TXOPs in the set. That is, if the CCA succeeds for the first TXOP in a set, the gNB can utilize all the TXOPs in the set and transmit all the beams without additional CCA. In some embodiments, if the gNB fails CCA for the first TXOP in a set, it will skip all the TXOPs in the set and try CCA for the first TXOP in the next set. When the CCA succeeds for the first TXOP in a set, the gNB may utilize all the TXOPs in the set and thus transmit all the paging beams without further CCA. When that is done, the gNB may skip any remaining TXOPs in the paging window.

If CCA fails for all the sets of TXOPs with predetermined mapping between TXOPs and beams, the gNB may attempt to utilize the remaining TXOP(s) which are fewer than the number of beams, if there are any such TXOP(s) in the window. The gNB may perform CCA before any of these TXOP(s) and when/if this succeeds, the gNB can transmit the beams one after the other according to the TXOP to beam mapping until there are no more TXOPs in the paging window. In some embodiments, the gNB attempts CCA before the first of the remaining TXOP(s) in order to be able to transmit as many paging beams as possible, if the CCA succeeds. The TXOPs may be configured with or without longer gaps between two sets of TXOPs (with predetermined mapping between TXOPs and beams) than between TXOPs within a set.

Embodiment 6

In certain embodiments, the gNB can perform CCA before any TXOP in a set and when it succeeds, the gNB utilizes this TXOP and any remaining TXOP in the set to transmit a partial paging beam sweep. In some embodiments, if the gap between the last TXOP of a set and the first TXOP of the next set is the same as the gap between two TXOPs within a set (or at least short enough to not trigger the CCA requirement, e.g. shorter than 16 μs), the gNB continues immediately to transmit the remaining beams of the paging beam sweep utilizing the first TXOP(s) of the next set. This way, the gNB may transmit the full paging beam sweep as two partial beam sweeps, where the partial beam sweep containing the last beam(s) (according to the SSB correspondence) is transmitted first, followed by the partial beam sweep containing the first beam(s). For example, FIG. 4 illustrates the example where there is a LBT success for the third TXOP and that LBT success, e.g., CCA success, is used not only to transmit on the remaining TXOPs of the first set, i.e., the third and fourth TXOPs corresponding to the third and fourth beams, but also continues to the second set by transmitting on the fifth and sixth TXOPs corresponding to the first and second beams, respectively. In this manner, a complete beam sweep may be successfully transmitted, even if the successful CCA occurs in the middle of the set of TXOPs in a beam order.

If the gap between two sets of TXOPs with predetermined mapping between TXOPs and beams is long enough to require a new CCA for the first TXOP of the latter set, the gNB cannot continue with the second partial beam sweep in the set of TXOPs following the set which was used for the first partial beam sweep without performing a successful CCA for the first TXOP in this set. If this succeeds, the gNB may transmit the second partial beam sweep as described above, but if the CCA fails, the gNB has to wait until the next (or another) set of TXOPs and try CCA for the first TXOP of this set. When/if the CCA succeeds, the gNB may transmit the second partial beam sweep as described above.

According to certain embodiments, if the CCA succeeds when the remaining TXOP(s) in the window only correspond to a partial beam sweep which consists of fewer beams than the partial or full beam sweep the gNB has left to transmit, the gNB transmits a subset of the beams it has left to transmit, preferably utilizing all the remaining TXOP(s) in the paging window.

Embodiment 7

According to certain embodiments, the TXOPs are configured throughout the paging window with so short gaps in between (e.g. shorter than 16 µs) that the same CCA can be used for multiple TXOPs. In some embodiments, there is no predetermined mapping between TXOPs and beams. The gNB may perform CCA for any of the TXOPs and when/if it succeeds, the gNB transmits all the beams utilizing sequential TXOPs, preferably transmitting the beams in the order as they correspond to SSBs.

Optionally, in some embodiments, the gNB may choose not to transmit all the beams in a sequence, but may transmit only a subset of them and switch to some other task (e.g., "suspend" the paging beam sweep transmission), e.g. other kinds of transmission than paging or switch to TDD UL mode. If possible, the gNB may attempt to resume the paging beam sweep transmission later during the paging window. If the gNB has had a gap in its transmissions (e.g., it has "left the medium") since the paging beam sweep transmission was suspended, the gNB may perform CCA again and may not resume the paging beam sweep until CCA succeeds for a TXOP.

If the CCA succeeds when there are more beams left to transmit than there are remaining TXOPs in the window, then the gNB may utilize the remaining TXOP(s) to transmit paging beams, e.g. in the form of a partial beam sweep.

Embodiment 8

In certain embodiments, there is a predetermined association between the TXOPs and the beam direction, such as in the second set of embodiments, but the network node, gNB, attempts to transmit in all TXOPs, irrespective of success or failure of previous transmission attempts. For example, some beams will be transmitted multiple times if CCA succeeds multiple times. In this manner, the risk of reception failure, e.g. due to interference, may be compensated by transmitting the paging signal as often as possible using all available TXOPs.

Embodiment 9

Similarly, in certain embodiments, the TXOPs are sequentially allocated in beam order, e.g., as in the third or fourth sets of embodiments, but the gNB attempts to transmit in all TXOPs of the set(s) of TXOPs with predetermined mapping between TXOPs and beam directions, irrespective of success or failure of previous transmission attempts. That is, some beams may be transmitted multiple times, if CCA succeeds multiple times, but only once in each set of TXOPs with predetermined mapping between TXOPs and beam directions. In this manner, the risk of reception failure, e.g. due to interference, may be compensated by transmitting the paging signal as often as possible using all available TXOPs.

If there are additional TXOPs in the window, which do not form any set of TXOPs with predetermined mapping between TXOPs and beam directions, the gNB may use these TXOPs only for reattempting to transmit beam which still have not been successfully transmitted and/or, on top of that, also use these TXOPs for retransmitting already successfully transmitted beams.

Extensions and Variations Applicable to All the above Embodiments Embodiment 10 In certain embodiments, the UE may utilize the surplus of TXOPs to transmit something else than paging, even if all paging beams have not yet been successfully transmitted. For embodiments in which a predetermined TXOP-to-beam direction mapping is used, this mapping is maintained, even if some beams are skipped (and may be reattempted later). In some embodiments, if the gNB has any page to transmit, it may be required to attempt to transmit each beam direction at least once, so at least $N_{beam}$ TXOPs must be used for paging transmission attempts.

Embodiment 11

In certain embodiments, one or more of the above-described configurations are indicated or configured by the network, e.g., indicated in the system information, or possibly in dedicated RRC signaling. In this manner, the network may determine or cause the determination of which procedures or mechanisms (described in the embodiments herein) to use in the cell.

Embodiment 12

In certain embodiments, a TXOP may be a PDCCH monitoring occasion (not overlapping with UL symbols), as specified by a search space, e.g. the pagingSearchSpace or searchSpaceZero or any other configured search space.

Embodiment 13

In certain embodiments, the beam direction sequence follows an "effective SSB index" computed as the index given by the detected SSB index modulo $N_{beam}$. The concept of "effective SSB index" and the reasoning behind it is elaborated below.

In NR, the maximum value of the SSB index that can be signalled to the UE is 64 corresponding to FR2. It is noted that the maximum value is lower for FR1 (4 or 8), but in principle the signaling mechanism used for FR2 can be reused for NR-U to account for CCA failure. Because there are two SSB positions in each slot, the 64 indices can cover 32 slots, which corresponds to 32, 16 and 8 ms for 15, 30 and 60 kHz subcarrier spacing respectively. Thus, using a subset of the available 64 indices, any SSB position within a half-frame (duration=5 ms) can be addressed. Hence, in combination with the half-frame indicator, the UE can determine the frame timing for an arbitrary time shifted SSB position, with a shift granularity of half a slot.

In NR, the UE may assume that SSBs transmitted with the same SSB index on the same center frequency location are quasi co-located with respect to Doppler spread, Doppler shift, average gain, average delay, delay spread, and, when applicable, spatial RX parameters. However, the UE may not assume quasi co-location for any other SSB block transmissions. This implies that SSBs with different indices should be treated independently by the UE.

When the SSBs are allowed to shift in time, the SSB index detected by the UE should change depending on the shift. This can allow the UE to determine the frame timing, but it will also affect other procedures. For example, SSB based RRM measurements are done per SSB index, and the UE averages measurements only for SSBs detected with the same index. If the indices shift due to CCA failure, clearly the procedure can be affected if the shift is not taken into account. Similarly, RLM and RACH procedures can be affected since they also depend on the detected SSB index.

As an example, say that the gNB transmits four different SSBs. If CCA succeeded on the first attempt the gNB may transmit index 0, 1, 2, 3. In the next SSB period say that CCA failed on the first and second attempt but succeeded on the third, requiring the SSB transmissions to be delayed, the gNB may then transmit index 2, 3, 4, 5. From the UE's perspective it appears as though index 4 and 5 correspond to new SSBs and that index 0, 1 could not be detected. However, from the gNB's perspective it is simply transmitting the same 4 SSBs as in the previous period but shifted in time for the current period. Thus, the UE needs to know that even if the indices detected for two SSBs are not the same, the actual SSBs are in fact the same, and thus should not be treated independently. In other words, the UE may determine that two SSBs are quasi co-located even if their index differs.

In certain embodiments, this is achieved by the UE computing an "effective SSB index" given by the detected SSB index modulo $N_{beam}$, where $N_{beam}$ is the number of SSBs. This effective SSB index is then used instead of the detected SSB index for the purposes of RRM and RLM measurements and also for indicating PRACH occasions and, if desired, also for determining the SSB matching to a certain paging transmission. In some embodiments, an exception may be made for frame timing for which the UE would use the actual detected SSB indices, not the effective indices.

Figure 5:
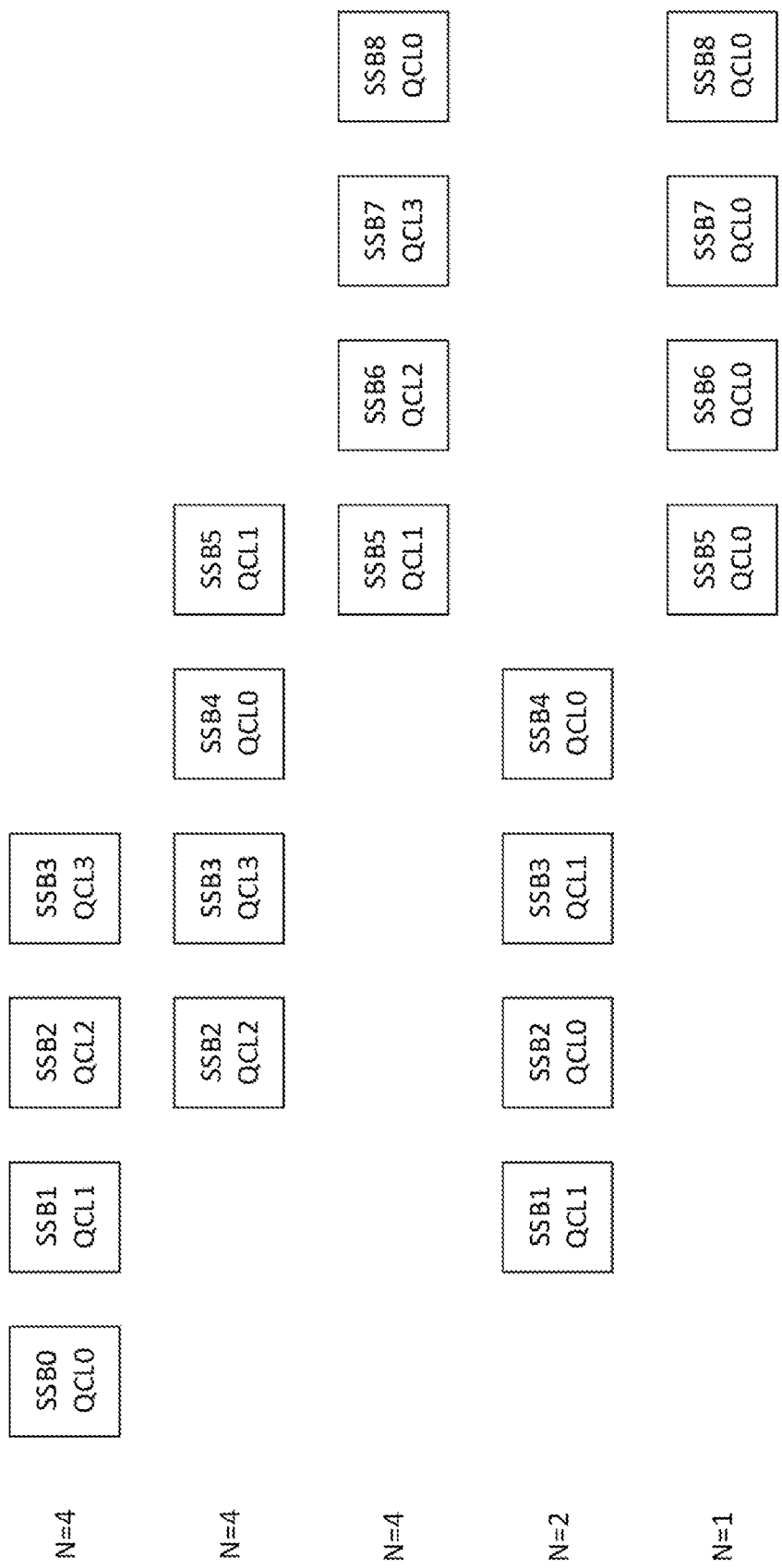
FIG. 5 illustrates certain example SSB positions and their respective, SSB index and effective SSB index, or QCL index, for select values of Nbeam, in accordance with certain embodiments.

FIG. 5 illustrates several examples for different values of $N_{beam}$ assuming a DRS with 4 SS/PBCH blocks. Note that basic repetition can be achieved with $N_{beam}=1$. QCLx denotes which SSBs the UE may assume to be quasi co-located. (Note that the notation "N" is used instead of "$N_{beam}$" in FIG. 5, i.e. "N" denotes the number of SSBs in the illustrated embodiment). The illustrated example, shows different SSB positions and their respective, SSB index (SSBx) and effective SSB index, or QCL index (QCLx).

Embodiment 14

In certain embodiments, where actual transmissions (not just attempts or transmission opportunities) can occur densely enough (e.g., with less than 16 μs gaps between transmissions), the same CCA can be used for multiple transmissions. If slightly longer gaps occur, a differently-length CCA (e.g., a 25 μs CCA) can be used for subsequent beams when CCA has succeeded for a beam transmission. For example, this may depend on whether the TXOPs are configured with no or very short gaps in between. The gaps (e.g., a time period between two TXOPs, i.e., between the TXOPs in a pair of TXOPs) may vary in length between different pairs of TXOPs. For instance, two back to back TXOPs may be followed by a gap fallowed by two back to back TXOPs, etc. The larger fraction of the gaps that are short enough, e.g. shorter than 16 μs, the more often a single CCA can enable multiple transmissions.

Further, certain embodiments may have different levels of advantage based on how the TXOPs are utilized. For example, if a TXOP is skipped (while there is still one or more beam that have not been successfully transmitted yet), this will often result in a too long gap to allow utilization of the same CCA for transmissions on both side of the gap. Accordingly, this aspect of how TXOPs are utilized may vary between the described embodiments.

Embodiment 15

In certain embodiments, including any of the embodiments described herein, the gNB may choose to transmit the same paging beam more than once (or at least attempt to transmit a beam despite that it has already been successfully transmitted), e.g., to increase the chance that any listening UE successfully receives the transmission.

Embodiment 16

In certain embodiments, including any of the embodiments described herein, an SSB may be used for paging transmission mapping in which the full number of SSBs are mapped to a smaller number of paging transmissions (i.e., a mapping of the type $K_1$ to $K_2$ where $K_2<K_1$). As a result, each paging transmission may cover a larger area than an SSB transmission in order for the paging transmissions to together cover an equally large area as the SSB transmissions do together (e.g., an entire a cell).

According to certain embodiments, the "many-to-fewer" SSB to paging transmission mapping is carried out with reference to a "virtual paging beam index" that equals FLOOR(actual SSB index/N), where N is a number smaller than or equal to the number of SSBs used in the cell (and the actual SSB indices are numbered sequentially from 0). For instance, setting the virtual paging beam index=FLOOR (actual SSB index/2) would map each pair of SSB beams to one paging beam (since two successive SSBs will map to one virtual paging beam index). This would be suitable if the paging beams are twice as wide as the SSB beams. In principle, any number of SSBs can be mapped to any smaller number of paging beams/transmissions. However, in some embodiments, the number of SSBs is an integer multiple of the number of paging beams/transmissions.

In a particular embodiment, the SSBs are mapped to a single paging transmission, i.e. the beamforming configuration of the paging transmission has to be such that it covers (at least) the entire intended coverage area, i.e. typically the same coverage area as the SSB beams cover together. In this embodiment, the virtual paging beam index=FLOOR(actual SSB index/NSSB), where NSSB denotes the number of SSBs used in the cell, i.e. all SSBs would map to the same virtual beam index 0. This mapping of all SSBs into a single paging beam can be used when a single paging transmission is intended to cover the full coverage area, e.g. an omnidirectional transmission or a sector-wide beam or some other beamform, depending on the shape of the coverage area and the position of the antenna(s) in relation to the coverage area.

Note that even if each paging beam transmission covers the entire coverage area, multiple transmissions may be needed to allow some UEs at the cell edge to gather enough energy, e.g. using soft-combining, to enable reliable decoding of the transmission. Mapping all SSBs to a single paging beam may correspond to the same beamforming configuration being used for all paging transmissions if the gNB transmits paging more than once in the paging window. As a result, a set of paging beams using the same beamforming configuration is provided.

Further, in some embodiments, NSSB TXOPs are sufficient to provide a surplus of TXOPs in a paging window. In some embodiments, fewer than NSSB TXOPs are configured, since as long as there are more TXOPs than there are paging beams to transmit, there will be a surplus of TXOPs. In the case where only a single beam is used for paging, then, as long as there is more than one TXOP in the window, the gNB will have more than one opportunity to transmit the single beam (e.g., the single beamforming configuration) to be used for paging transmission.

Certain aspects of these embodiments may also be applied to, or combined with, any of the other embodiments described herein. For examples, embodiments described herein with a predetermined mapping between TXOPs and beams may get shorter "sets of TXOPs" (e.g. shorter "sweeps of TXOPs"). Although other embodiments may be less affected, the gNB may transmit fewer beams altogether.

Figure 6:
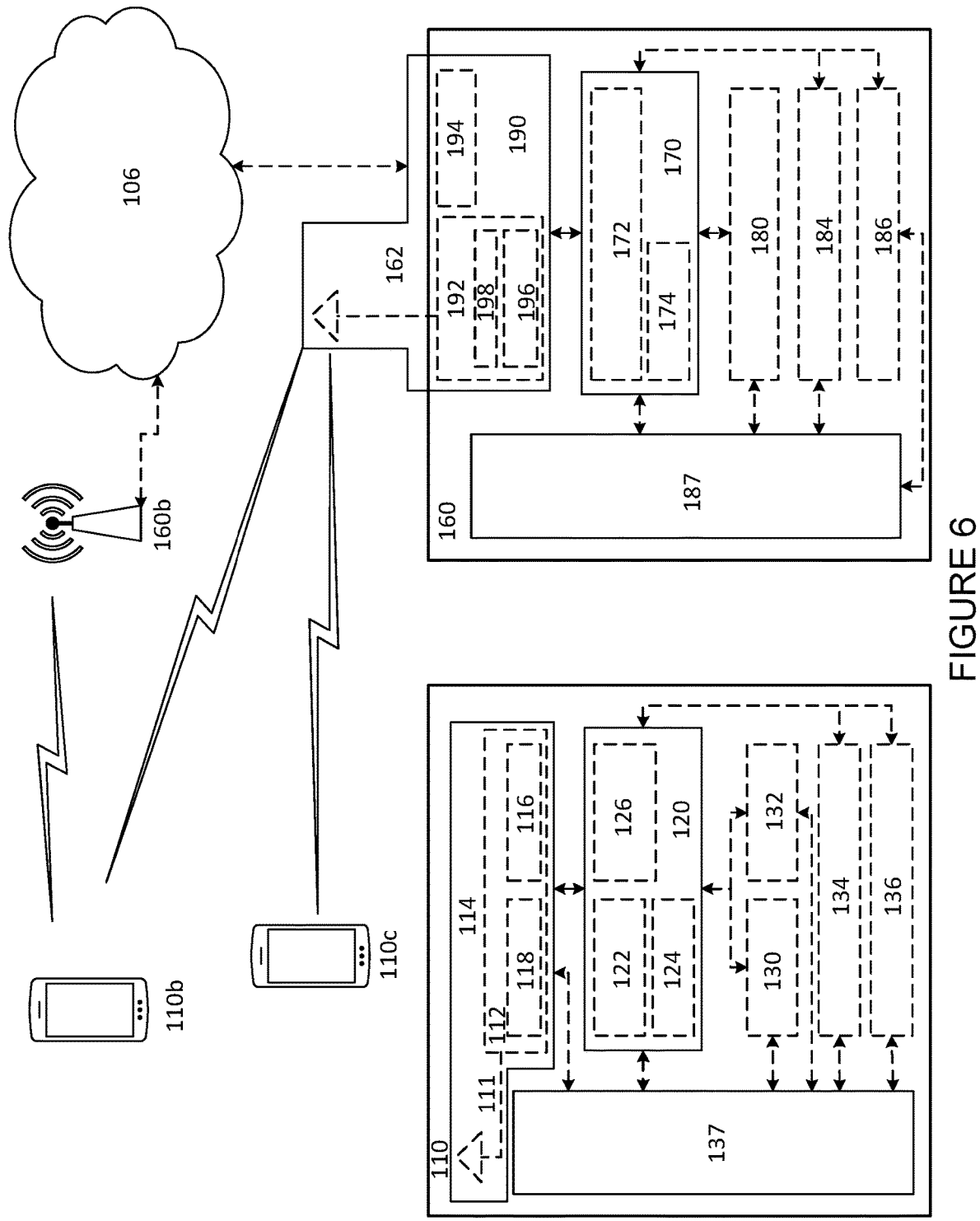
FIG. 6 illustrates an example wireless network, in accordance with certain embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 7:
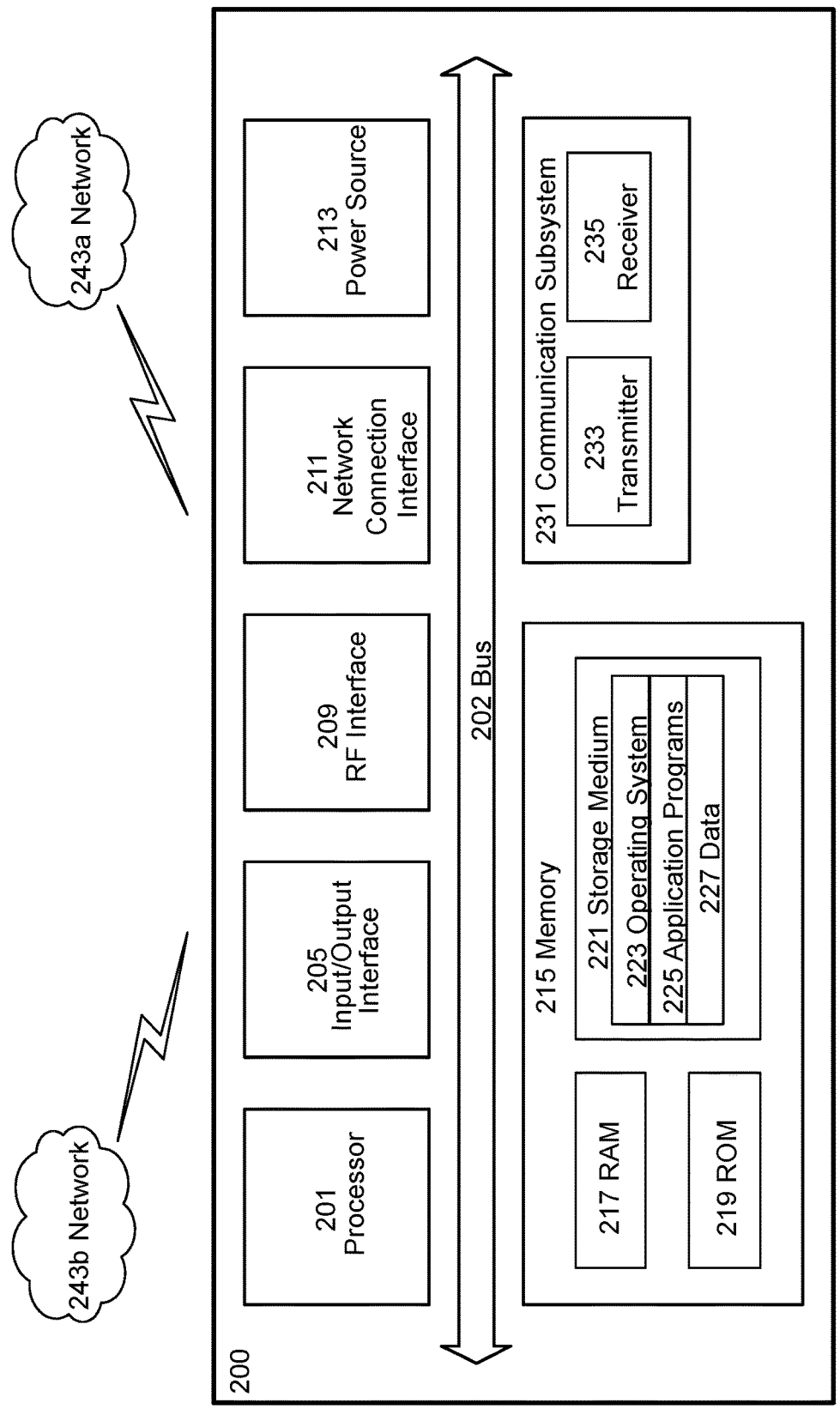
FIG. 7 illustrates an example user equipment, in accordance with certain embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 220 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
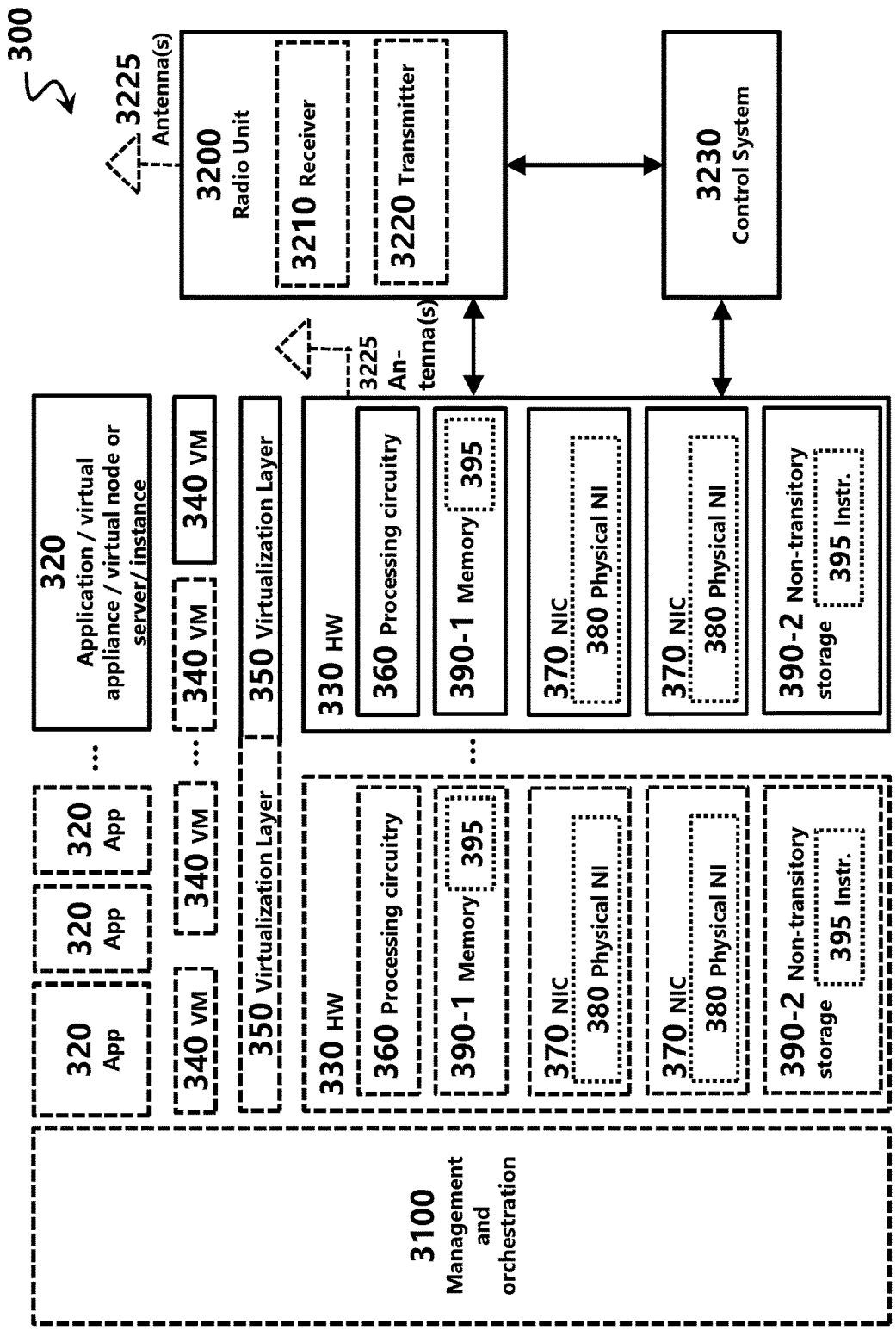
FIG. 8 illustrates an example virtualization environment, in accordance with certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 9:
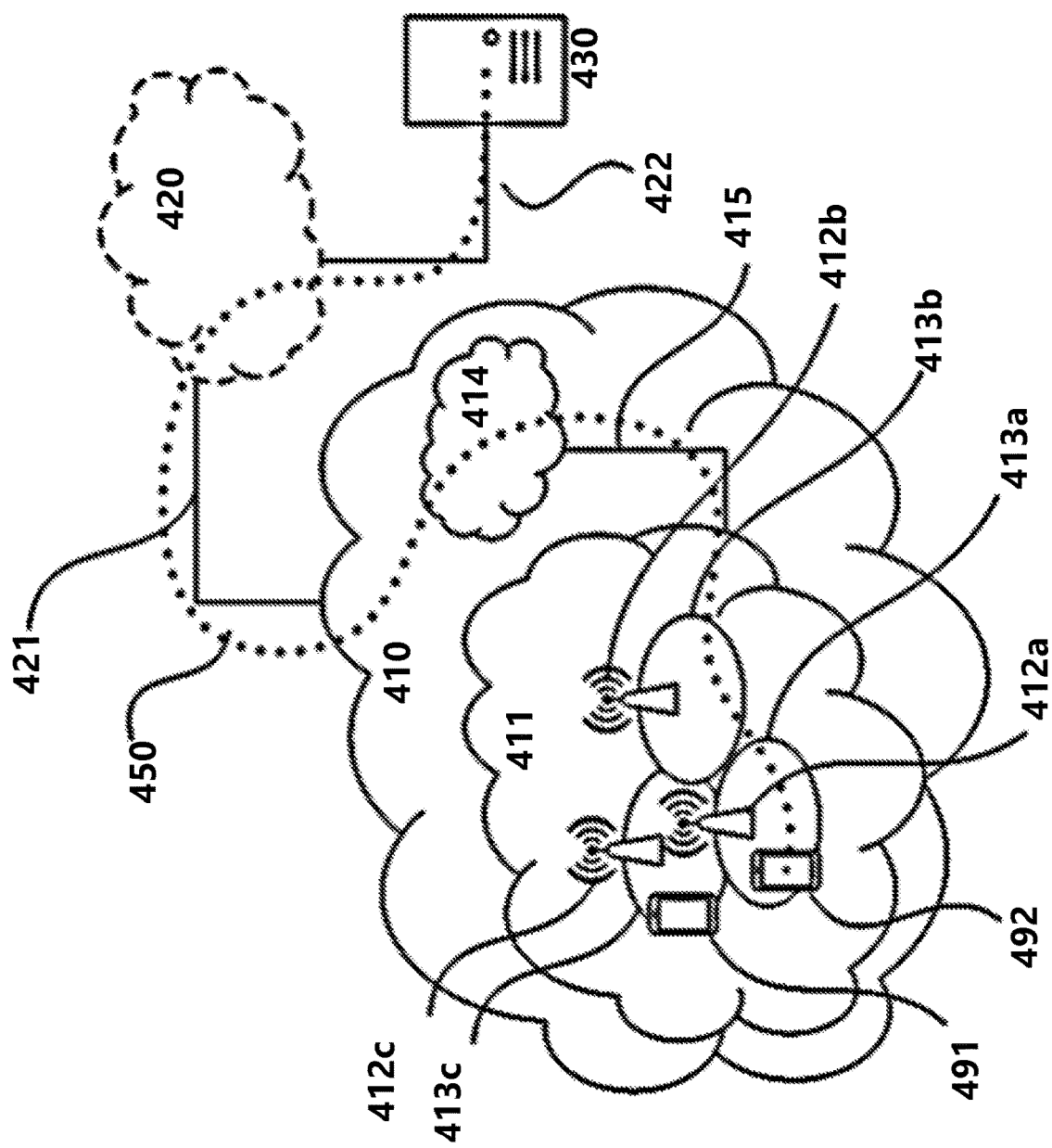
FIG. 9 illustrate an example telecommunication network connected via an intermediate network to a host computer, in accordance with certain embodiments.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 7) served by base station 520. Communication interface 526 may be configured to facilitate connection 560 to host computer 510. Connection 560 may be direct or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 10:
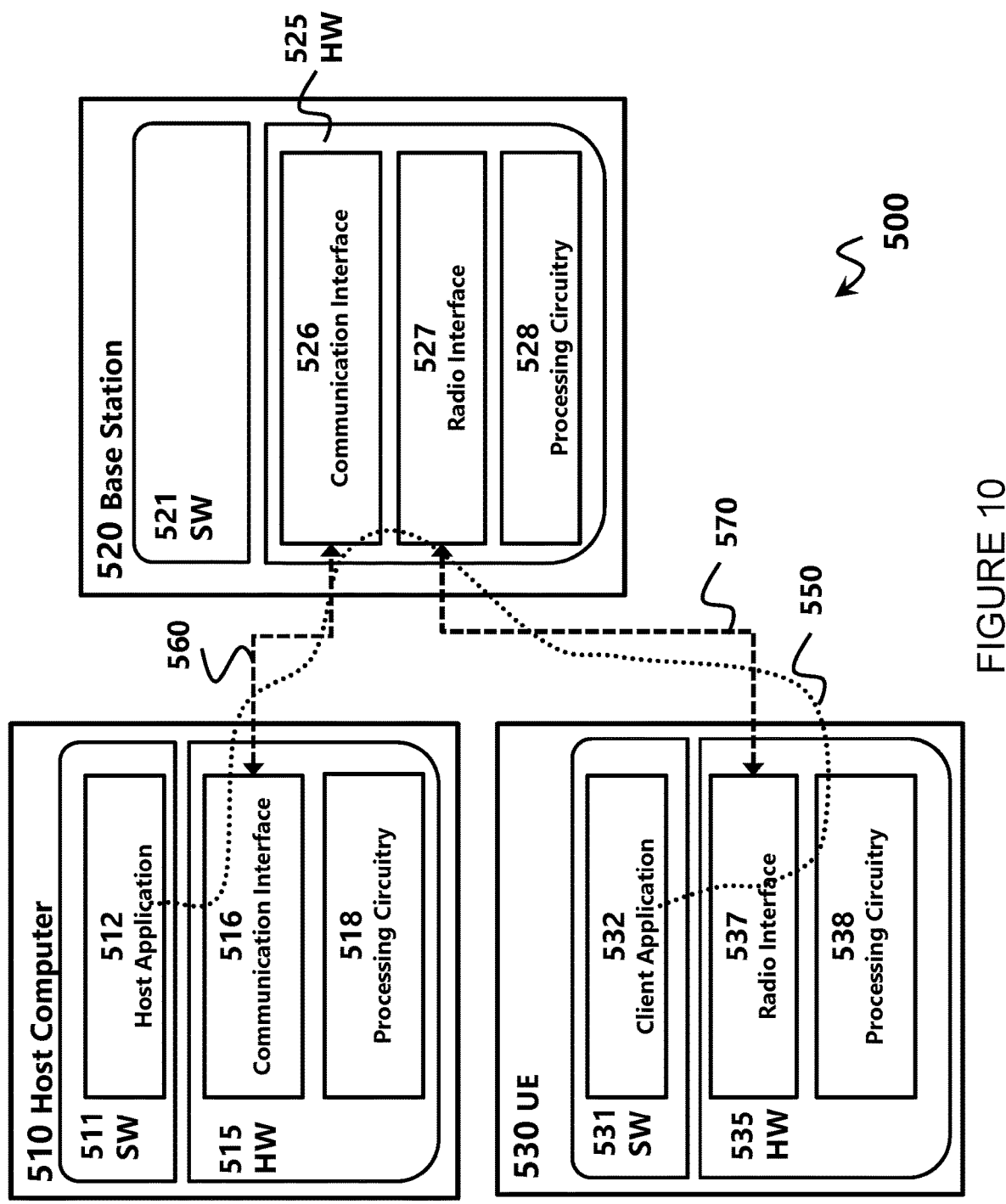
FIG. 10 illustrates an example host computer communicating via a base station with a user equipment over a partially wireless connection, in accordance with certain embodiments.

It is noted that host computer 510, base station 520 and UE 530 illustrated in FIG. 10 may be similar or identical to host computer 430, one of base stations 412a, 412b, 412c and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 11:
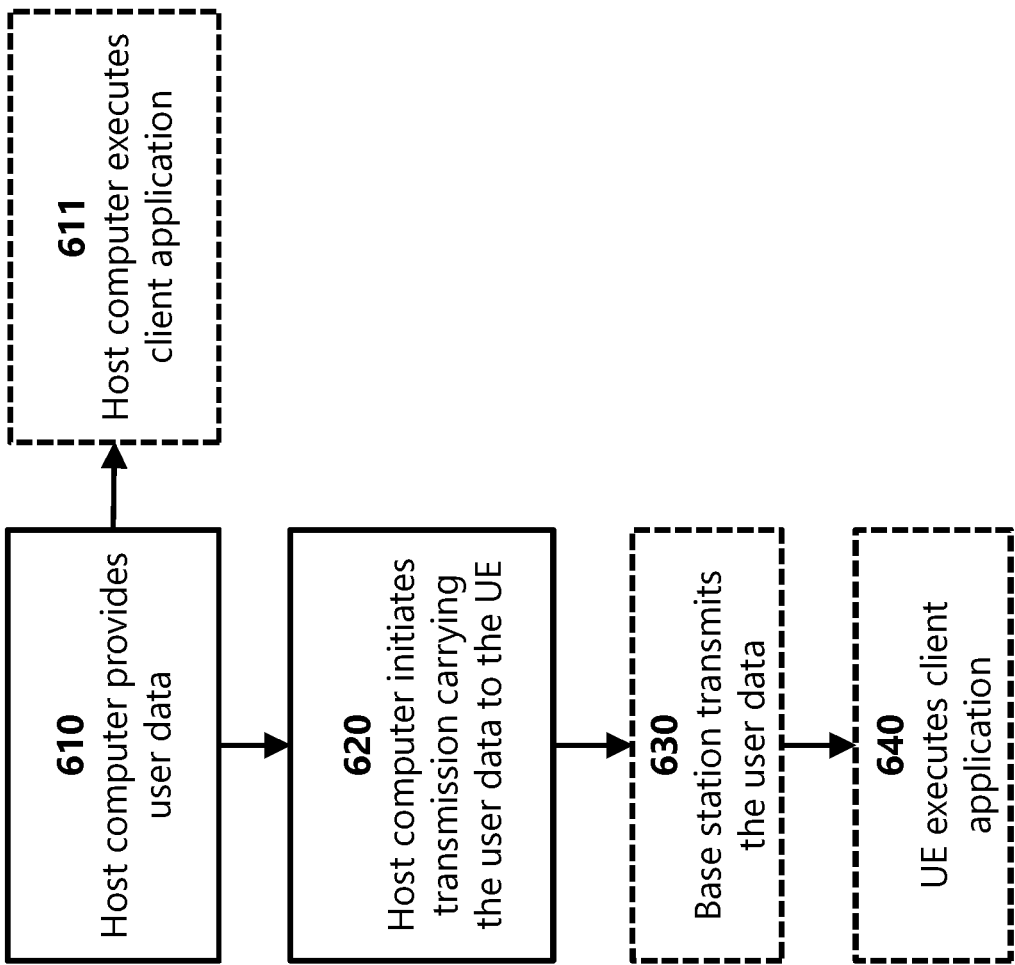
FIG. 11 is a flowchart illustrating an example method implemented in a communication system, in accordance certain embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 12:
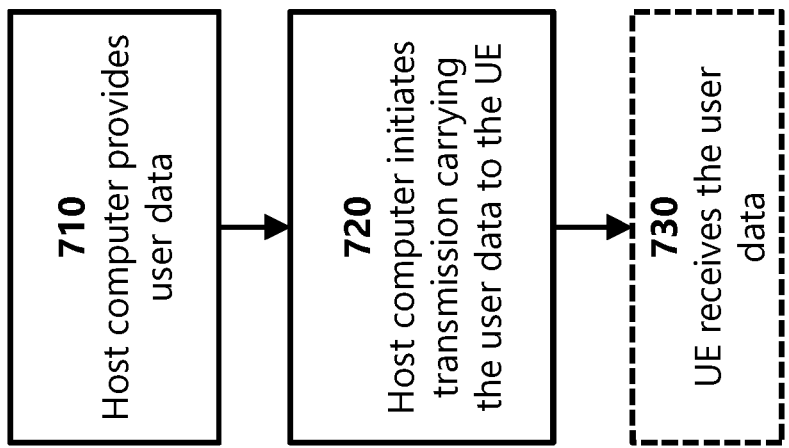
FIG. 12 is a flowchart illustrating an example method implemented in a communication system, in accordance with certain embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 13:
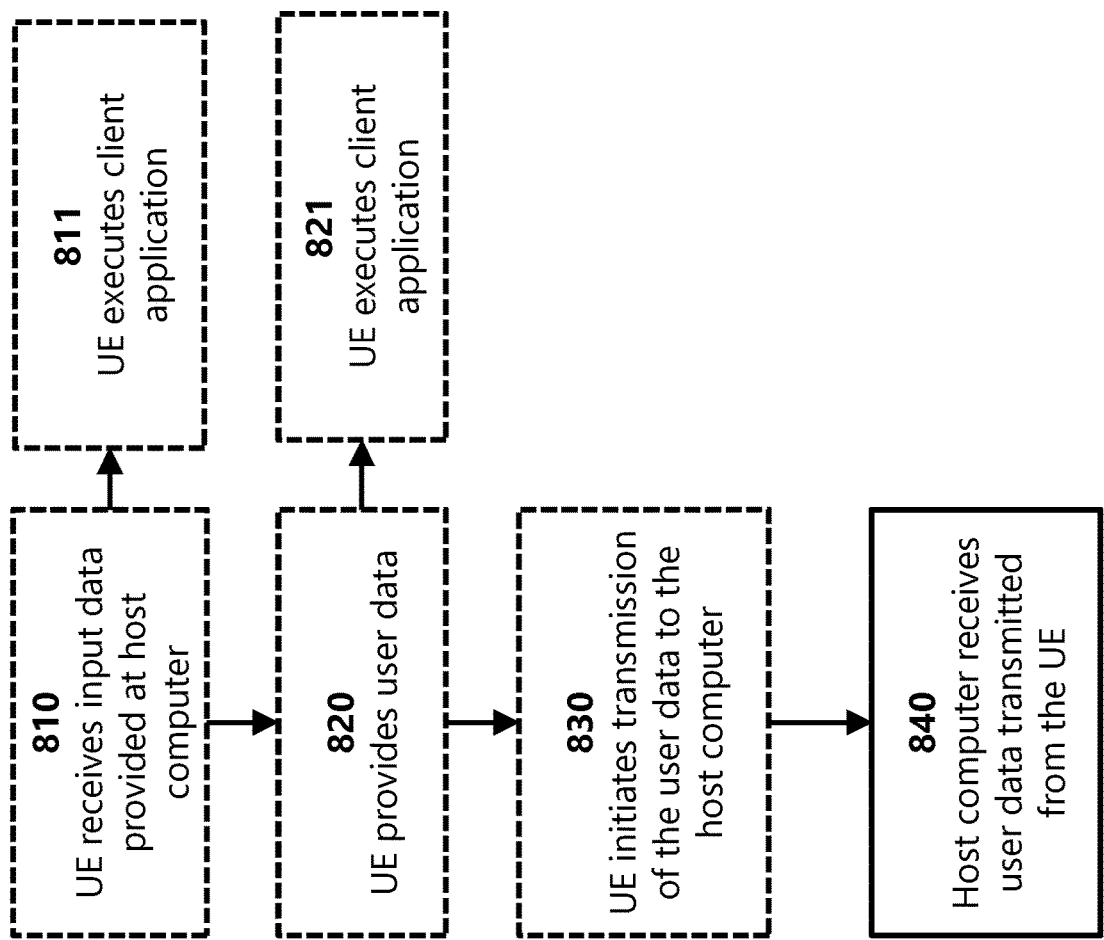
FIG. 13 is a flowchart illustrating an example method implemented in a communication system, in accordance with certain embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 14:
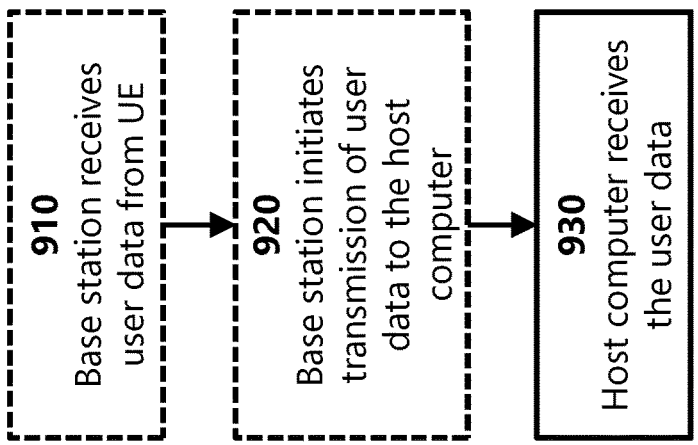
FIG. 14 is a flowchart illustrating an example method implemented in a communication system, in accordance with certain embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 15:
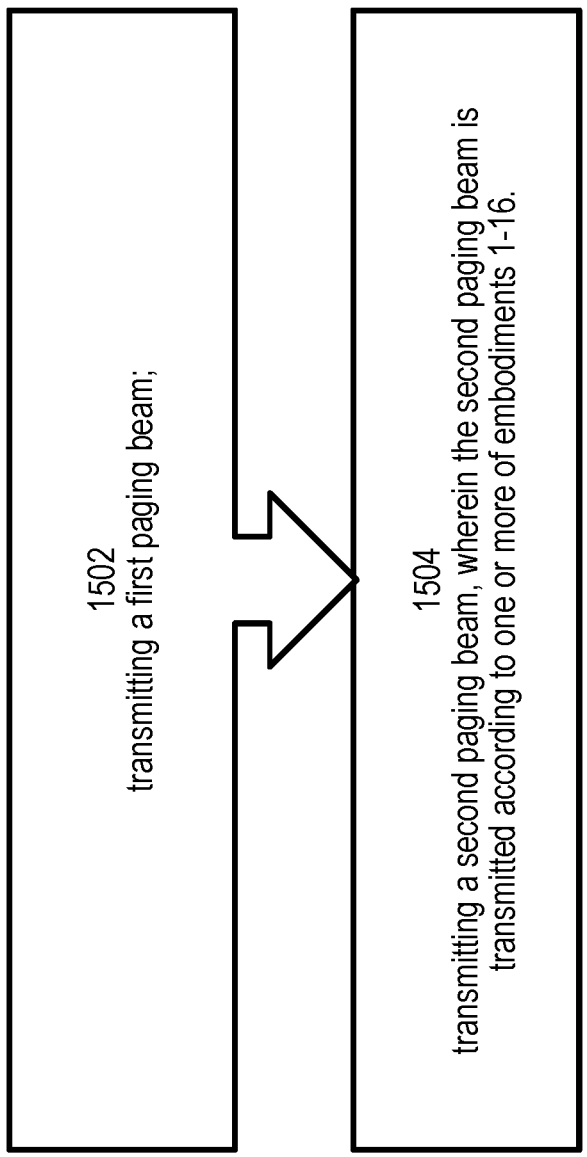
FIG. 15 illustrates a first example method performed by a network node, in accordance with certain embodiments.

FIG. 15 depicts a method in accordance with particular embodiments, the method begins at step 1502 with the transmission of a first paging beam. Then at step 1504 a second paging beam is transmitted. The second paging beam is transmitted according to one or more of Embodiments 1-16 described above. Step 1504 may be repeated several times for subsequent beams.

Figure 16:
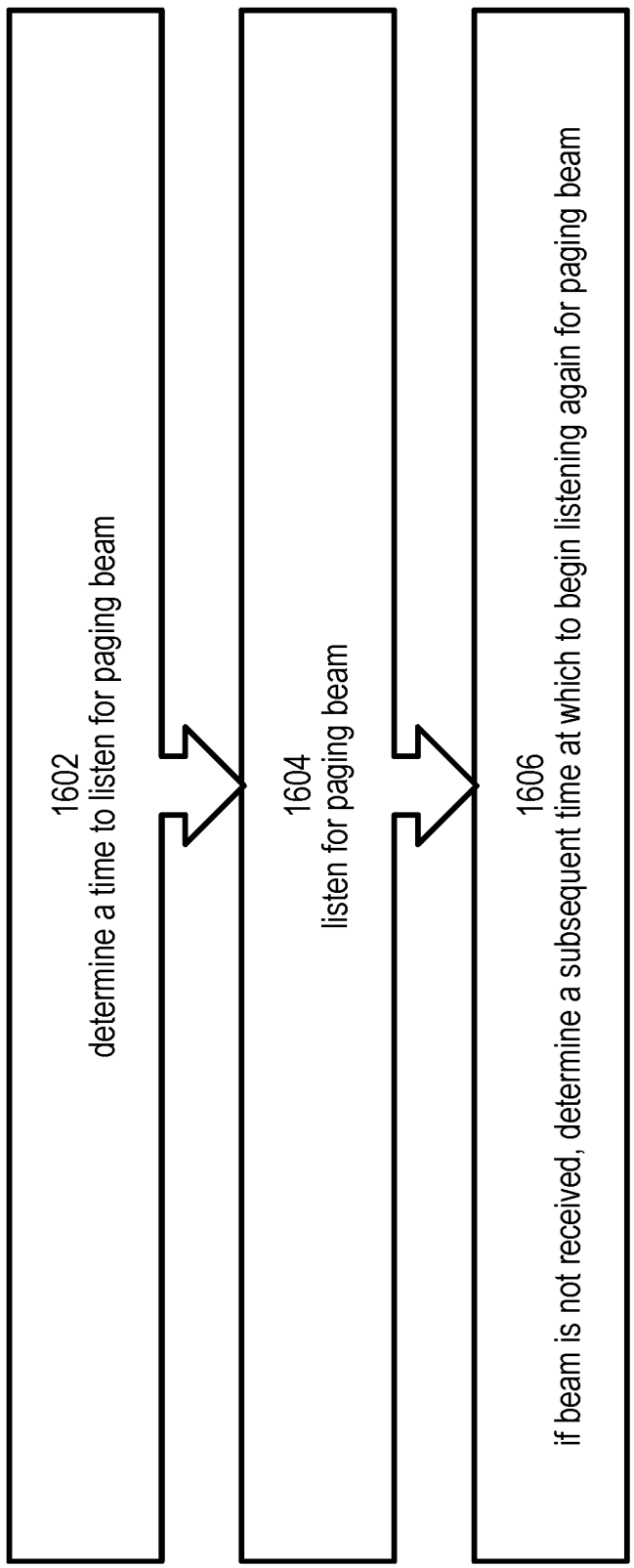
FIG. 16 illustrates a first example method performed by a wireless device, in accordance with certain embodiments.

FIG. 16 depicts a method in accordance with particular embodiments. The method begins at step 1602 with a UE determining a time to listen for a paging beam. The determined time may be based on any one or more of Embodiments 1-16 described above. Then at step 1604 the UE listens for the paging beam at the determined time (or, if applicable a subsequent time as determined at step 1606). If the UE does not receive the paging beam at the determined time, it may determine a subsequent time to listen for the paging beam. The subsequent listening time may be determined using the same embodiment of Embodiments 1-16 that was used to initialing determine the time to listen for the paging beam. This may be repeated multiple times (e.g., until it successfully receives a paging beam).

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Sample Embodiments

Group A Embodiments

1. A method performed by a wireless device for receiving a paging message, the method comprising:
   determining a time at which to begin to listen for a paging beam;
   listening for the paging beam.
2. The method of 1 wherein determining the time depends on which of Embodiments 1-16 described above are being used to transmit the paging beam.
3. The method of any of 1-2 further comprising receiving the paging beam
4. The method of any of 1-2 further comprising:
   determining that a beam was not received during the determined listening time; and
   determining a subsequent time at which to begin to listen again for the paging beam.

5. The method of any of the previous embodiments, further comprising:
   providing user data; and
   forwarding the user data to a host computer via the transmission to the base station.

Group B Embodiments

6. A method performed by a base station for transmitting a paging message, the method comprising:
   transmitting a first paging beam;
   transmitting a second paging beam, the second paging beam transmitted according to one or more of Embodiments 1-16 described above.

7. The method of any of the previous embodiments, further comprising:
   obtaining user data; and
   forwarding the user data to a host computer or a wireless device.

Group C Embodiments

8. A wireless device for receiving a paging message, the wireless device comprising:
   processing circuitry configured to perform any of the steps of any of the Group A embodiments; and
   power supply circuitry configured to supply power to the wireless device.

9. A base station for transmitting a paging message, the base station comprising:
   processing circuitry configured to perform any of the steps of any of the Group B embodiments;
   power supply circuitry configured to supply power to the base station.

10. A user equipment (UE) for receiving a paging message, the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.

11. A communication system including a host computer comprising:
    processing circuitry configured to provide user data; and
    a communication interface configured to forward the user data to a cellular network for transmission to a user equipment (UE),
    wherein the cellular network comprises a base station having a radio interface and processing circuitry, the base station's processing circuitry configured to perform any of the steps of any of the Group B embodiments.

12. The communication system of the previous embodiment further including the base station.

13. The communication system of the previous 2 embodiments, further including the UE, wherein the UE is configured to communicate with the base station.

14. The communication system of the previous 3 embodiments, wherein:
    the processing circuitry of the host computer is configured to execute a host application, thereby providing the user data; and
    the UE comprises processing circuitry configured to execute a client application associated with the host application.

15. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs any of the steps of any of the Group B embodiments.

16. The method of the previous embodiment, further comprising, at the base station, transmitting the user data.

17. The method of the previous 2 embodiments, wherein the user data is provided at the host computer by executing a host application, the method further comprising, at the UE, executing a client application associated with the host application.

18. A user equipment (UE) configured to communicate with a base station, the UE comprising a radio interface and processing circuitry configured to performs the of the previous 3 embodiments.

19. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the UE's components configured to perform any of the steps of any of the Group A embodiments.

20. The communication system of the previous embodiment, wherein the cellular network further includes a base station configured to communicate with the UE.

21. The communication system of the previous 2 embodiments, wherein:
    the processing circuitry of the host computer is configured to execute a host application, thereby providing the user data; and
    the UE's processing circuitry is configured to execute a client application associated with the host application.

22. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs any of the steps of any of the Group A embodiments.

23. The method of the previous embodiment, further comprising at the UE, receiving the user data from the base station.

24. A communication system including a host computer comprising:
    communication interface configured to receive user data originating from a transmission from a user equipment (UE) to a base station, wherein the UE comprises a radio interface and processing circuitry, the UE's processing circuitry configured to perform any of the steps of any of the Group A embodiments.

25. The communication system of the previous embodiment, further including the UE.

26. The communication system of the previous 2 embodiments, further including the base station, wherein the base station comprises a radio interface configured to communicate with the UE and a communication interface configured to forward to the host computer the user data carried by a transmission from the UE to the base station.

27. The communication system of the previous 3 embodiments, wherein:
the processing circuitry of the host computer is configured to execute a host application; and
the UE's processing circuitry is configured to execute a client application associated with the host application, thereby providing the user data.

28. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

29. A method implemented in a communication system including a host computer, a base station and a user equipment (UE), the method comprising:
at the host computer, receiving user data transmitted to the base station from the UE, wherein the UE performs any of the steps of any of the Group A embodiments.

30. The method of the previous embodiment, further comprising, at the UE, providing the user data to the base station.

31. The method of the previous 2 embodiments, further comprising:
at the UE, executing a client application, thereby providing the user data to be transmitted; and
at the host computer, executing a host application associated with the client application.

32. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

33. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

34. The communication system of the previous embodiment further including the base station.

35. The communication system of the previous 2 embodiments, further including the UE, wherein the UE is configured to communicate with the base station.

36. The communication system of the previous 3 embodiments, wherein:

the processing circuitry of the host computer is configured to execute a host application;
the UE is configured to execute a client application associated with the host application, thereby providing the user data to be received by the host computer.

37. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

38. The method of the previous embodiment, further comprising at the base station, receiving the user data from the UE.

39. The method of the previous 2 embodiments, further comprising at the base station, initiating a transmission of the received user data to the host computer.

Figure 17:
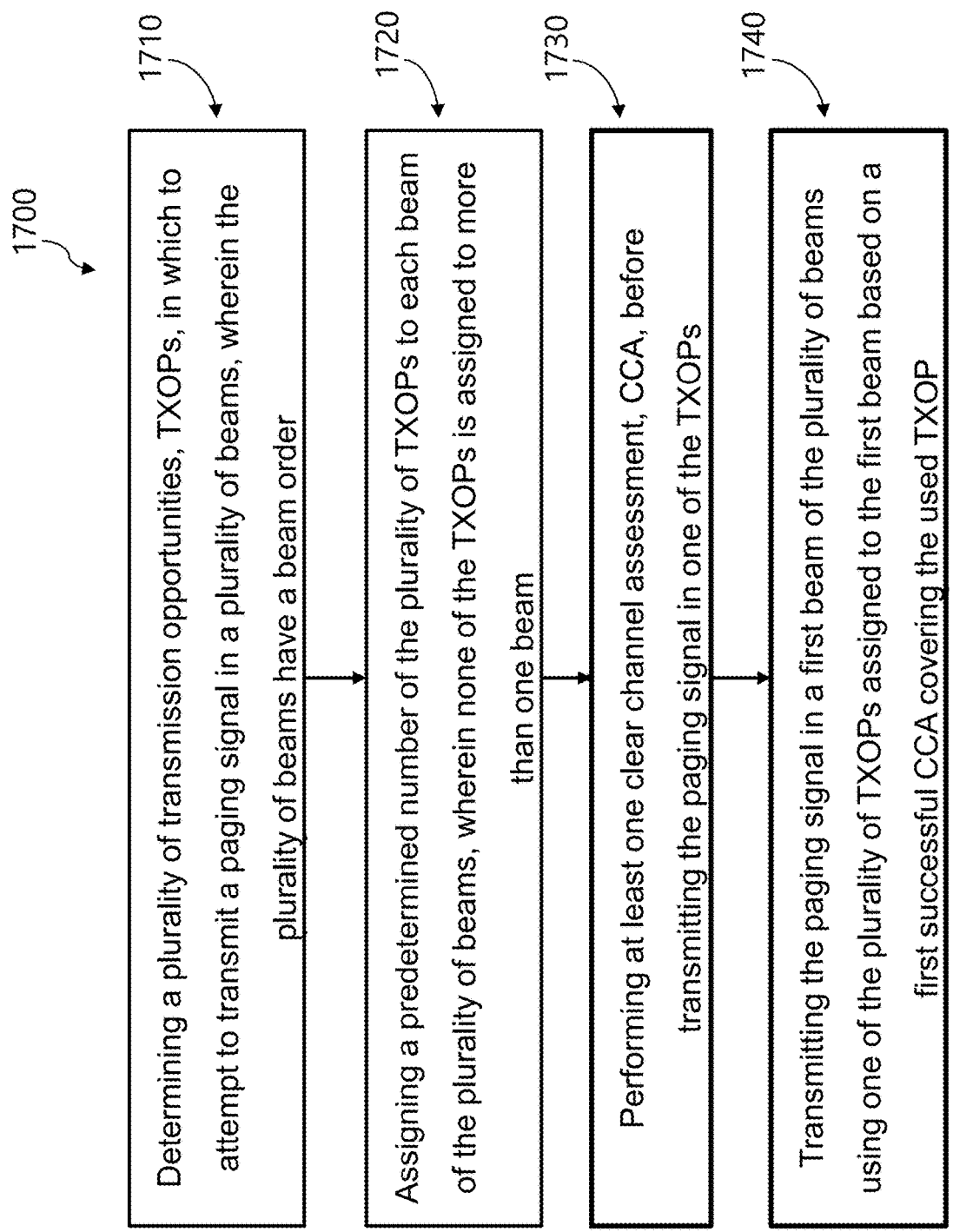
FIG. 17 illustrates a second example method performed by a network node, in accordance with certain embodiments.

FIG. 17 illustrates an example flowchart for an example method 1700 for a network node, such as network node 160 of FIG. 6 or any suitable network node used for 4G/LTE or 5G/NR communications, such as an eNB or a gNB. Method 1700 may begin at step 1710, in which a plurality of transmission opportunities, TXOPs, in which to attempt to transmit a paging signal in a plurality of beams, are determined. For example, a gNB may determine the number of beams (e.g., corresponding to the number of SSBs in some instances) and the number of transmission opportunities per beam to determine a total number of TXOPs. In certain embodiments, the plurality of TXOPs are Physical Downlink Control Channel, PDCCH, transmission opportunities that do not overlap with uplink symbols. As described above, TXOPs from the perspective of a network node may correspond to monitoring occasions (e.g., PDCCH monitoring occasions) from the perspective of a wireless device.

The plurality of beams may have a beam order in which transmission may be attempted. The beam order may be known to the wireless devices within a cell covered by the network node. Each beam may be associated with a direction or a coverage area. The plurality of beams, together, may cover the entirety of the cell served by the network node, such that the successfully transmission of a paging signal on each of the beams ensures that the paging signal was transmitted across the entire cell (but note, that in some circumstances, this may not guarantee reception by a wireless device in the cell, e.g., due to interference or mobility.)

At step 1720, the method comprises assigning a predetermined number of the plurality of TXOPs to each beam of the plurality of beams. In some embodiments, none of the TXOPs is assigned to more than one beam. Thus, in some embodiments, no two beams are assigned the same TXOP (e.g., each beam is assigned a set of TXOPs that is unique from the set of TXOPs assigned to any of the other beams in the plurality of beams). In certain embodiments, the predetermined number of TXOPs assigned to each beam is greater than 1. For example, the same X number of TXOPs may be assigned to each of N beams, where the total number of TXOPs is X multiplied by N. In certain embodiments, the X number of TXOPs for each beam is allocated back to back in time such as shown in the illustrated example in FIG. 3. As another example, in certain embodiments, the X number of TXOPs are allocated in the beam sequence as shown in the illustrated example in FIG. 4. In this manner, even if the TXOPs exceed the number of beams (or SSBs), the network node may allocate those extra TXOPs in a suitable manner to provide additional paging coverage.

At step 1730, the network node performs at least one clear channel assessment, CCA, before transmitting the paging signal in one of the TXOPs. For example, the network node may perform a CCA as part of a requirement for transmission on unlicensed spectra before using the wireless resources for signaling. As described herein, the network node may perform the CCA at the beginning of a set of TXOPs (e.g., in a beam sequence) and/or in the middle of a set of TXOPs. In some embodiments, the network node need only perform a single CCA to cover a set of the plurality of TXOPs due to the smaller gaps between the adjacent TXOPs. In other embodiments, multiple CCAs may be performed, e.g., in response to a previously failed CCA and/or the expiration of a previously successful CCA for following TXOPs. In certain embodiments, performing a CCA may comprise determining whether the CCA is successful or unsuccessful. The network node may transmit a paging signal using certain TXOPs based on determining that the CCA is successful or may abstain from transmitting a paging signal using certain TXOPs based on determining that the CCA is unsuccessful. Further examples of either transmitting or abstaining from transmitting a paging signal based on the results of the CCA are provided below.

At step 1740, the network node may transmit the paging signal in a first beam of the plurality of beams using one of the plurality of TXOPs assigned to the first beam based on a first successful CCA covering the used TXOP. For example, the network node may perform a successful CCA prior to the used TXOP assigned to the first beam. In response, the network node may determine it may transmit using the TXOP and transmit the paging signal on that TXOP. In some embodiments, the CCA was performed prior to a TXOP that precedes the used TXOP, e.g., a TXOP corresponding to a beam earlier in the beam sequence or later in the beam sequence if allowed to sweep around through the beam sequence (e.g., see FIG. 4). In this manner, the network node may effectively utilize additional transmission opportunities for paging wireless devices in the covered cell.

In certain embodiments, once the paging signal in the first beam is transmitted successfully, e.g., as in step 1740, the network node may abstain from attempting transmission of the paging signal on the first beam within the later assigned TXOPs for the first beam. In other embodiments, the network node attempts to transmit on all TXOPs of the plurality of TXOPs assigned to the first beam regardless of a previous success of transmitting the paging signal on the first beam in a previous TXOP assigned to the first beam.

In certain embodiments, the network node receives configuration information that indicates how the network node should attempt to transmit the paging signal using the plurality of TXOPs. For example, the configuration information may indicate how to assign the plurality of TXOPs, e.g., according to a predetermined mapping, or indicate when and how to use CCAs to determine whether to signal using a TXOP.

In certain embodiments, method 1700 may include one or more additional or optional steps or substeps. Additionally, steps may be performed in parallel or in any suitable order. For example, In certain embodiments, if a failed CCA prevents the transmission of the paging signal in one of the TXOPs assigned to a first beam, a later available TXOP of the plurality of TXOPs assigned to the first beam is used to attempt the transmission of the paging signals. Further, in certain embodiments, the assignment of the plurality of TXOPs is according to one or more of the described embodiments herein. Additionally, in certain embodiments, the transmitting of the paging signal(s) is according to one or more of the embodiments described herein.

Figure 18:
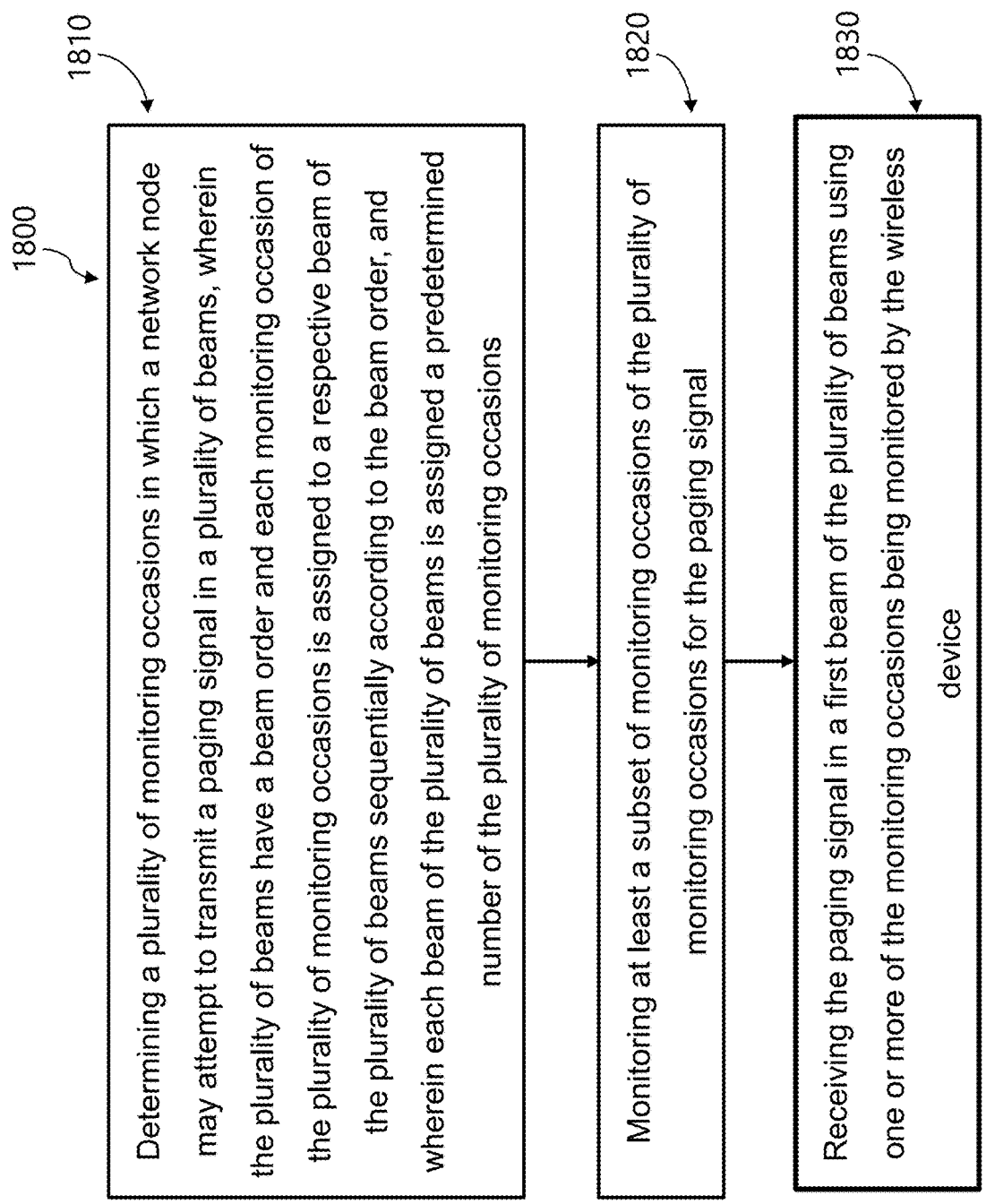
FIG. 18 illustrates a second example method performed by a wireless device, in accordance with certain embodiments.

FIG. 18 illustrates an example flowchart for an example method 1800 for a wireless device, such as wireless device 110 of FIG. 6, wireless device 200 of FIG. 7, or any suitable wireless device used for 4G/LTE or 5G/NR communications, such any suitable UE. Method 1800 may begin at step 1810 with determining a plurality of monitoring occasions in which a network node may attempt to transmit a paging signal in a plurality of beams. As described above, monitoring occasions (e.g., PDCCH monitoring occasions) from the perspective of a wireless device correspond to TXOPs from the perspective of a network node. Thus, from the perspective of the network node, a monitoring occasion in which a network node may attempt to transmit a paging signal refers to a TXOP available to the network node (e.g., a TXOP that the network node is configured to support such that the network node is permitted to transmit paging signals during the TXOP but is not required to transmit paging signals during that TXOP).

The plurality of beams that may be monitored for paging signals during the monitoring occasions have a beam order. For example, the plurality of beams may have a beam order in which transmission by a network node may be attempted. The beam order may be known to the wireless device. Each beam may be associated with a direction or a coverage area. The plurality of beams, together, may cover the entirety of the cell served by the network node, such that the successfully transmission of a paging signal on each of the beams ensures that the paging signal was transmitted across the entire cell (but note, that in some circumstances, this may not guarantee reception by a wireless device in the cell, e.g., due to interference or mobility.) Each monitoring occasion of the plurality of monitoring occasions is assigned to a respective beam of the plurality of beams sequentially according to the beam order, and each beam of the plurality of beams is assigned a predetermined number of the plurality of monitoring occasions. In some embodiments, none of the monitoring occasions is assigned to more than one beam. Thus, in some embodiments, no two beams are assigned the same monitoring occasion (e.g., each beam is assigned a set of monitoring occasions that is unique from the set of monitoring occasions assigned to any of the other beams in the plurality of beams). In certain embodiments, the predetermined number is greater than one such that each beam is assigned at least two of the monitoring occasions. In certain embodiments, a UE may determine the number of beams (e.g., corresponding to the number of SSBs in some instances) and the number of monitoring occasions per beam to determine a total number of available monitoring occasions. In certain embodiments, the plurality of monitoring occasions are Physical Downlink Control Channel, PDCCH, monitoring occasions that do not overlap with uplink symbols.

At step 1820, at least a subset of monitoring occasions of the plurality of monitoring occasions are monitored for the paging signal. For example, the wireless device may determine to monitor only the monitoring occasions assigned to one or more beams that covers the current location or coverage area in which the wireless device is located. As a particular example, for a target beam to receive, the wireless device may determine which monitoring occasions are assigned to that target beam and only monitor in the time periods corresponding to those monitoring occasions. In the example where the monitoring occasions are assigned sequentially in the beam order, the wireless device may cycle between monitoring for the paging signal and not monitoring across the paging window as the monitoring occasions cycle through the beam sequence.

In certain embodiments, the plurality of monitoring occasions are divided equally into beam subsets for each beam of the plurality of beams. In some embodiments, the subsets defined to include the (n*S+K)th monitoring occasions of the plurality of monitoring occasions is assigned to the Kth beam out of S total beams for n equal to zero and each integer value between 0 and a predefined size value, not inclusive. In this respect, the wireless device may only monitor the (n*S+K)th monitoring occasions for a given beam associated with the wireless device and ignore the remaining monitoring occasions for monitoring for the paging signal.

At step 1830, the wireless device receives the paging signal in a first beam of the plurality of beams using one or more of the monitoring occasions being monitored in step 1820. For example, in some embodiments, the wireless device receives the paging signal in the first beam in only one of the monitoring occasions being monitored by the wireless device. In other embodiments, the wireless device receives the paging signal in the first beam multiple times using more than one of the monitoring occasions being monitored by the wireless device. In this manner, the wireless device may receive the paging signal without having to monitor all of the monitoring occasions, e.g., in some embodiments, the wireless device need only monitor the subset of monitoring occasions.

In certain embodiments, method 1800 may include one or more additional or optional steps or substeps. Additionally, steps may be performed in parallel or in any suitable order. For example, In certain embodiments, the wireless device further determines the subset of monitoring occasions to monitor based on configuration information received from the wireless communications network. Further, in certain embodiments, the assignment of the plurality of monitoring occasions is according to one or more of the described embodiments herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

In addition, techniques, systems, subsystems, and methods described and illustrated in the various embodiments as discrete or separate may be combined or integrated with other systems, modules, techniques, or methods without departing from the scope of the present disclosure. Other items shown or described as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A method for use in a network node in wireless communications network, the method comprising:
    determining a plurality of transmission opportunities, TXOPs, in which to attempt to transmit a paging signal in a plurality of beams, wherein the plurality of beams have a beam order;
    assigning a predetermined number of the plurality of TXOPs to each beam of the plurality of beams, wherein none of the TXOPs is assigned to more than one beam and wherein the predetermined number is greater than one;
    performing at least one clear channel assessment, CCA, before transmitting the paging signal in one of the TXOPs; and
    upon successful CCA, transmitting the paging signal in a first beam of the plurality of beams using a first TXOP of the plurality of TXOPs assigned to the first beam, and
    upon a failed CCA, performing a second CCA and transmitting the paging signal in a second beam of the plurality of beams using a first TXOP of the plurality of TXOPs assigned to the second beam, the second beam being after the first beam in the beam order, and transmitting the first beam of the plurality of beams using a second TXOP of the plurality of TXOPs assigned to the first beam based on a successful second CCA, wherein the first TXOP of the plurality of TXOPs assigned to the second beam occurs after the first TXOP assigned to the first beam and before the second TXOP assigned to the first beam, the second TXOP assigned to the first beam occurring later in time than the first TXOP assigned to the first beam.

2. The method of claim 1, wherein assigning a predetermined number of the plurality of TXOPs to each beam of the plurality of beams comprises:
    assigning at least a first sequence of TXOPs of the plurality of TXOPs to the plurality of beams in same order as the beam order.

3. The method of claim 2, further comprising:
    performing a first CCA, the first CCA covering each TXOP in the first sequence of TXOPs, wherein the first CCA is either successful or unsuccessful;
    in response to the first CCA being successful, transmitting the paging signal on each of the plurality of beams using each of the first sequence of TXOPs; and
    in response to the first CCA being unsuccessful, abstaining from transmitting the paging signal on any of the plurality of beams using any of the first sequence of TXOPs.

4. The method of claim 2, further comprising:
    performing a first CCA after at least one TXOP of the first sequence of TXOPs has passed, wherein the first CCA covers each remaining TXOP in the first sequence of TXOPs; and
    in response to the first CCA being successful, transmitting the paging signal at least on each of a plurality of remaining beams using each of the remaining TXOPs in the first sequence of TXOPs, wherein the plurality of remaining beams are beams of the plurality of beams to which the remaining TXOPs in the first sequence of TXOPs have been assigned.

5. The method of claim 2, wherein a predetermined number of the plurality of TXOPs to each beam of the plurality of beams further comprises:
    assigning a second sequence of TXOPs of the plurality of TXOPs to the plurality of beams in the same order as the beam order, wherein the first TXOP of the second sequence of TXOPs corresponds to the TXOP in the plurality of TXOPs that follows directly after the last TXOP of the first sequence of TXOPs.

6. The method of claim 5, further comprising:
    performing a first CCA after at least one TXOP of the first sequence of TXOPs has passed, wherein the first CCA covers each remaining TXOP in the first sequence of TXOPs and at least one TXOP of the second sequence of TXOPs; and in response to the first CCA being successful, transmitting the paging signal at least on:

each of a plurality of remaining beams using each of the remaining TXOPs in the first sequence of TXOPs, wherein the plurality of remaining beams are beams of the plurality of beams to which the remaining TXOPs in the first sequence of TXOPs have been assigned; and the at least one TXOP of the second sequence of TXOPs.

7. The method of claim 6, wherein the at least one TXOP of the second sequence of TXOPs contains a number of sequential TXOP(s) equal to the number of beams in the plurality of beams that were not transmitted in the TXOPs of the first sequence of TXOPs.

8. The method of claim 1, further comprising:
attempting to transmit on all TXOPs of the plurality of TXOPs assigned to the first beam regardless of a previous success of transmitting the paging signal on the first beam in a previous TXOP assigned to the first beam.

9. The method of claim 1, further comprising using one of the plurality of TXOPs to transmit a signal other than the paging signal.

10. The method of claim 1, further comprising mapping a plurality of synchronization signal block beams to the plurality of beams used for the paging signal, wherein the number of synchronization signal block beams is greater than the number of the plurality of beams used for the paging signal.

11. A network node in a wireless communications network, the network node comprising:
a memory configured to store instructions; and
processing circuitry configured to execute the instructions, whereby the network node is configured to:
determine a plurality of transmission opportunities, TXOPs, in which to attempt to transmit a paging signal in a plurality of beams, wherein the plurality of beams have a beam order;
assign a predetermined number of the plurality of TXOPs to each beam of the plurality of beams, wherein none of the TXOPs is assigned to more than one beam beam and wherein the predetermined number is greater than one;
perform at least one clear channel assessment, CCA, before transmitting the paging signal in one of the TXOPs; and
upon successful CCA, transmit the paging signal in a first beam of the plurality of beams using a first TXOP of the plurality of TXOPs assigned to the first beam, and
upon a failed CCA, perform a second CCA and transmit the paging signal in a second beam of the plurality of beams using a first TXOP of the plurality of TXOPs assigned to the second beam, the second beam being after the first beam in the beam order, and transmitting the first beam of the plurality of beams using a second TXOP of the plurality of TXOPs assigned to the first beam based on a successful second CCA, wherein the first TXOP of the plurality of TXOPs assigned to the second beam occurs after the first TXOP assigned to the first beam and before the second TXOP assigned to the first beam, the second TXOP assigned to the first beam occurring later in time than the first TXOP assigned to the first beam.

12. The network node of claim 11, wherein assigning a predetermined number of the plurality of TXOPs to each beam of the plurality of beams comprises:
assigning at least a first sequence of TXOPs of the plurality of TXOPs to the plurality of beams in same order as the beam order.

13. The network node of claim 12, wherein the network node is further configured to:
perform a first CCA, the first CCA covering each TXOP in the first sequence of TXOPs, wherein the first CCA is either successful or unsuccessful;
in response to the first CCA being successful, transmit the paging signal on each of the plurality of beams using each of the first sequence of TXOPs; and
in response to the first CCA being unsuccessful, abstain from transmitting the paging signal on any of the plurality of beams using any of the first sequence of TXOPs.

14. The network node of claim 12, wherein the network node is further configured to:
perform a first CCA after at least one TXOP of the first sequence of TXOPs has passed, wherein the first CCA covers each remaining TXOP in the first sequence of TXOPs; and
in response to the first CCA being successful, transmit the paging signal at least on each of a plurality of remaining beams using each of the remaining TXOPs in the first sequence of TXOPs, wherein the plurality of remaining beams are beams of the plurality of beams to which the remaining TXOPs in the first sequence of TXOPs have been assigned.

15. The network node of claim 12, wherein assigning a predetermined number of the plurality of TXOPs to each beam of the plurality of beams further comprises:
assigning a second sequence of TXOPs of the plurality of TXOPs to the plurality of beams in the same order as the beam order, wherein the first TXOP of the second sequence of TXOPs corresponds to the TXOP in the plurality of TXOPs that follows directly after the last TXOP of the first sequence of TXOPs.

16. The network node of claim 15, wherein the network node is further configured to:
perform a first CCA after at least one TXOP of the first sequence of TXOPs has passed, wherein the first CCA covers each remaining TXOP in the first sequence of TXOPs and at least one TXOP of the second sequence of TXOPs; and
in response to the first CCA being successful, transmit the paging signal at least on:
each of a plurality of remaining beams using each of the remaining TXOPs in the first sequence of TXOPs, wherein the plurality of remaining beams are beams of the plurality of beams to which the remaining TXOPs in the first sequence of TXOPs have been assigned; and
the at least one TXOP of the second sequence of TXOPs.

17. The network node of claim 16, wherein the at least one TXOP of the second sequence of TXOPs contains a number of sequential TXOP(s) equal to the number of beams in the plurality of beams that were not transmitted in the TXOPs of the first sequence of TXOPs.

18. The network node of claim 11, wherein the network node is further configured to attempt to transmit on all TXOPs of the plurality of TXOPs assigned to the first beam regardless of a previous success of transmitting the paging signal on the first beam in a previous TXOP assigned to the first beam.

19. The network node of claim 11, wherein the network node is further configured to use one of the plurality of TXOPs to transmit a signal other than the paging signal.

20. The network node of claim 11, wherein the network node is further configured to map a plurality of synchronization signal block beams to the plurality of beams used for the paging signal, wherein the number of synchronization signal block beams is greater than the number of the plurality of beams used for the paging signal.

21. A method for use in a wireless device in wireless communications network, the method comprising:
   obtaining an indication of a plurality of monitoring occasions in which a network node may attempt to transmit a paging signal in a plurality of beams, wherein the plurality of beams have a beam order and wherein a predetermined number of the plurality of monitoring occasions are assigned to each beam of the plurality of beams and wherein none of the monitoring occasions are assigned to more than one beam, the predetermined number is greater than one;
   monitoring at least a subset of monitoring occasions of the plurality of monitoring occasions for the paging signal wherein the monitored occasions are associated with a first beam of the plurality of beams; and
   receiving the paging signal in the first beam of the plurality of beams using one or more of the monitoring occasions being monitored by the wireless device, wherein:
      upon successfully receiving the paging signal in the first beam, refraining from monitoring any subsequent monitoring occasions of the predetermined number of monitoring occasions associated with the first beam; and
      upon failing to receive the paging signal in the first beam, additionally monitoring at least a subset of monitoring occasions associated with a second beam of the plurality of beams, the second beam being after the first beam in the beam order, and wherein a first monitoring occasion associated with the second beam occurs after a first monitoring occasion associated with the first beam and before any of the subsequent monitoring occasions associated with the first beam.

22. The method of claim 21, wherein the plurality of monitoring occasions are divided equally into subsets where each of the subsets is associated with a different one of the plurality of beams and each of the subsets is defined to include the monitoring occasions assigned to the beam associated with the subset which are defined to include the (X*S+K)th monitoring occasions, where S is the total number of beams in the plurality of beams and K is the number of the beam in the plurality of beams which is associated with the subset and the subset comprises one monitoring occasion for each value of X for X equal to zero and each integer value between zero and the predetermined number minus one.

23. The method of claim 21, wherein the beam order follows an index based on an effective synchronization signal block index or synchronization signal block QCL index.

24. The method of claim 21, further comprising receiving the paging signal in the first beam using more than one of the monitoring occasions being monitored by the wireless device.

25. The method of claim 21, further comprising determining the at least a subset of monitoring occasions to monitor based on a previously received subset of synchronization signal block transmissions or a previously received subset of synchronization signal transmissions.

26. A wireless device in a wireless communications network, the wireless device comprising:
   a memory configured to store instructions; and
   processing circuitry configured to execute the instructions, whereby the wireless device is configured to:
      obtain an indication of a plurality of monitoring occasions in which a network node may attempt to transmit a paging signal in a plurality of beams, wherein the plurality of beams have a beam order and wherein a predetermined number of the plurality of monitoring occasions are assigned to each beam of the plurality of beams and wherein none of the monitoring occasions are assigned to more than one beam;
      monitor at least a subset of monitoring occasions of the plurality of monitoring occasions for the paging signal wherein the monitored occasions are associated with a first beam of the plurality of beams; and
      receive the paging signal in the first beam of the plurality of beams using one or more of the monitoring occasions being monitored by the wireless device, wherein:
         upon successfully receiving the paging signal in the first beam, refraining from monitoring any subsequent monitoring occasions of the predetermined number of monitoring occasions associated with the first beam; and
         upon failing to receive the paging signal in the first beam, additionally monitoring at least a subset of monitoring occasions associated with a second beam of the plurality of beams, the second beam being after the first beam in the beam order, and wherein a first monitoring occasion associated with the second beam occurs after a first monitoring occasion associated with the first beam and before any of the subsequent monitoring occasions associated with the first beam.

27. The wireless device of claim 26, wherein the plurality of monitoring occasions are divided equally into subsets where each of the subsets is associated with a different one of the plurality of beams and each of the subsets is defined to include the monitoring occasions assigned to the beam associated with the subset which are defined to include the (X*S+K)th monitoring occasions, where S is the total number of beams in the plurality of beams and K is the number of the beam in the plurality of beams which is associated with the subset and the subset comprises one monitoring occasion for each value of X for X equal to zero and each integer value between zero and the predetermined number minus one.

28. The wireless device of claim 26, wherein the beam order follows an index based on an effective synchronization signal block index or synchronization signal block QCL index.

29. The wireless device of claim 26, wherein the wireless device is further configured to receive the paging signal in the first beam using more than one of the monitoring occasions that the wireless device is configured to monitor.

30. The wireless device of claim 26, wherein the wireless device is further configured to determine the at least a subset of monitoring occasions to monitor based on a previously received subset of synchronization signal block transmissions or a previously received subset of synchronization signal transmissions.

\* \* \* \* \*